(12) United States Patent
Yamada

(10) Patent No.: US 6,398,651 B1
(45) Date of Patent: Jun. 4, 2002

(54) GAME DEVICE AND METHOD FOR IMPLEMENTING A SCREEN-DISPLAYED CARD GAME

(75) Inventor: Nobuhiro Yamada, Hannou (JP)

(73) Assignee: Konami Co., Ltd., Tokyo (JP)

( * ) Notice: Subject to any disclaimer, the term of this patent is extended or adjusted under 35 U.S.C. 154(b) by 0 days.

(21) Appl. No.: 09/528,104

(22) Filed: Mar. 17, 2000

(30) Foreign Application Priority Data

Mar. 18, 1999 (JP) .......................................... 11-074598
Feb. 4, 2000 (JP) ...................................... 2000-028066

(51) Int. Cl.⁷ ............................ G06F 17/30; A63F 1/04
(52) U.S. Cl. ............................... 463/43; 463/1; 463/42; 463/11
(58) Field of Search ...................... 463/7–11, 1, 40–44; 273/298, 304–308

(56) References Cited

U.S. PATENT DOCUMENTS

| | | | |
|---|---|---|---|
| 4,480,840 A | * 11/1984 | Chang | 273/292 |
| 4,888,727 A | * 12/1989 | Lam | 273/236 |
| 5,435,568 A | * 7/1995 | Black | 273/308 |
| 5,662,332 A | 9/1997 | Garfield | |
| 5,689,561 A | * 11/1997 | Pace | 463/29 |
| 6,200,216 B1 | * 3/2001 | Peppel | 463/1 |

FOREIGN PATENT DOCUMENTS

GB  2 230 462  10/1990

OTHER PUBLICATIONS

'Final Fantasy VIII Users Manual', 1999 Square Co. Ltd., pp. 17, 36.*

'Final Fantasy VIII: The Official Card Game Players' Guide', 1999, Bandai America, Inc., all.*

'Magic—The Gathering', ©2001 Wizards of the Coast, Inc., www.wizards.com.*

'Pokemon' 1995, 1998 Nintendo, Inc., Game Freaks Inc., www.pocket.ign.com.*

* cited by examiner

*Primary Examiner*—Mark Sager
*Assistant Examiner*—Steven Ashburn
(74) *Attorney, Agent, or Firm*—Sughrue Mion, PLLC

(57) ABSTRACT

In a storage medium storing a program, a storage device and a game device, a card game having rich variety can be implemented by determining win or loss on the basis of various judgement criteria. The cards used in the card game are divided into a plurality of groups which have continuous, cyclical strength differential relationships between the respective groups. The card game does not depend solely on the capability index of each card. Moreover, a variation of the card game can be increased by preparing trap cards which impart various functions and actions on the opponent's cards. Moreover, by including field card representing competition environments and causing the capability indices creature cards to vary according to the competition environment, a more interesting card game can be enjoyed by the game device.

25 Claims, 14 Drawing Sheets

| CARD NAME | FILE NAME | GROUP | FAMILY NAME | NORMAL | | FOREST | | WILDERNESS | | MOUNTAIN | | GRASSLAND | | SEA | | DARKNESS | |
|---|---|---|---|---|---|---|---|---|---|---|---|---|---|---|---|---|---|
| | | | | AT-TACK | DE-FENSE | AT-TACK | DE-FENSE | AT-TACK | DE-FENSE | AT-TACK | DE-FENSE | AT-TACK | DE-FENSE | AT-TACK | DE-FENSE | AT-TACK | DE-FENSE |
| A00 | m000 | A | FA | 3000 | 2500 | 3300 | 2750 | 3300 | 2750 | 3900 | 3250 | 3000 | 2500 | 3300 | 2750 | 3000 | 2500 |
| A01 | m001 | A | | 800 | 2000 | 880 | 2200 | 720 | 1800 | 720 | 1800 | 800 | 2000 | 880 | 2200 | 880 | 2200 |
| A02 | m002 | A | | 1200 | 1000 | 1560 | 1300 | 1320 | 1100 | 1080 | 900 | 1580 | 1300 | 1080 | 800 | 1200 | 1000 |
| A03 | m003 | A | | 1200 | 700 | 1320 | 770 | 1320 | 770 | 1560 | 910 | 1200 | 700 | 1320 | 770 | 1200 | 700 |
| A04 | m004 | A | | 1000 | 500 | 1000 | 500 | 900 | 450 | 900 | 450 | 900 | 450 | 900 | 450 | 1300 | 650 |
| A05 | m005 | A | | 1300 | 1400 | 1300 | 1400 | 1300 | 1400 | 1170 | 1260 | 1170 | 1260 | 1170 | 1260 | 1690 | 820 |
| A06 | m006 | A | | 1400 | 1200 | 1540 | 1320 | 1540 | 1320 | 1820 | 1560 | 1540 | 1320 | 1540 | 1320 | 1400 | 200 |
| A07 | m007 | A | | 800 | 600 | 1040 | 780 | 720 | 540 | 720 | 540 | 880 | 550 | 720 | 540 | 560 | 420 |
| A08 | m008 | A | | 500 | 200 | 550 | 220 | 550 | 260 | 500 | 200 | 500 | 200 | 350 | 140 | 650 | 260 |
| A09 | m009 | A | | 1500 | 800 | 1650 | 880 | 1650 | 880 | 1950 | 1040 | 1650 | 880 | 1650 | 880 | 1500 | 800 |
| B00 | m010 | B | | 1750 | 2030 | 1925 | 2233 | 2275 | 2639 | 1575 | 1827 | 1925 | 2233 | 1225 | 1421 | 1750 | 2030 |
| B01 | m011 | B | | 1800 | 1500 | 1800 | 1500 | 1980 | 1650 | 1620 | 1350 | 2340 | 1950 | 1620 | 1350 | 1800 | 1500 |
| B02 | m012 | B | | 1200 | 1400 | 1320 | 1540 | 1200 | 1400 | 1550 | 1820 | 1200 | 1400 | 1320 | 1540 | 840 | 980 |
| B03 | | B | | 1800 | | 2340 | | 1980 | | 1620 | | 1800 | | 1620 | | 1800 | |
| ... | | | | ... | | ... | | ... | | ... | | ... | | ... | | ... | |

FIG.4

GAME DEVICE AND METHOD FOR IMPLEMENTING A SCREEN-DISPLAYED CARD GAME

BACKGROUND OF THE INVENTION

1. Field of the Invention

The present invention relates to a game device for playing a card game, a computer-readable storage medium for storing the aforementioned card game, and an image display device for displaying images of the card game.

2. Description of the Related Art

In general, a wide variety of card games which involve various different cards and rules have been enjoyed by a wide range of men and women of all ages and these card games remain popular. Recently, a new card game has been proposed in U.S. Pat. No. 5,662,332 (hereinafter, called the reference). Specifically, the reference discloses a game which is played among players by preparing a plurality of cards having mutually different attributes and capabilities and by competing with one another so as to reduce the life points (LP) score of their opponent to zero.

Moreover, in the reference described above, it is also suggested that the card game can be programmed into a computer and played on the computer.

However, since the aforementioned card game involves many cards having different attributes, capabilities, and the like, and the rules of the game are complex for both adults and children, the card game is very popular among game mania who are experts for the card game but can not simply be enjoyed by anyone. Therefore, if the aforementioned card game were to be realized by a program for a game device, this would be unlikely to produce an increase in demand for the card game. In other words, if the card game were to be implemented by means of a computer program, then this would involve the major task of simplifying the rules, and the like, in some way, whilst maintaining the essential attraction of the game.

On the other hand, the present inventors, and others, have proposed a game device for playing, in a simple and enjoyable manner, a card game wherein different attributes and capabilities are assigned to various cards, and these cards are used by the players to reduce the life points (LP) score of their opponent, and a storage medium for storing software for implementing the aforementioned card game. The card game relating to this proposal (hereinafter, called the 'old card game') was simple for beginners and children to learn, and also attracted considerable demand as part of a game craze, thus receiving significant popularity across a wide range of people.

However, in order to prevent the aforementioned game from becoming out-of-date and also to attract the interest and attention of more customers, it has been necessary to develop the card game further. When the card game is developed in this way, it is necessary also to take into account compatibility with the old card game proposed previously.

SUMMARY OF THE INVENTION

It is an object of the present invention to provide a game device for implementing a card game (hereinafter, called the 'new card game'), wherein an old card game proposed previously can be developed further and more people can be attracted to the game.

It is a further object of the present invention to provide a game device whereby, in order to develop the card game, the relative strengths of the respective cards are determined by adding further conditions, rather than simply applying a differential to the points assigned to each card.

It is a further object of the present invention to provide a game device whereby the cards are categorized into a plurality of groups and the relative strengths of the various groups are determined in a continuous fashion.

It is a further object of the present invention to provide a game device whereby modifications can be made to the cards by means of external communication.

It is a further, object of the present invention to provide a computer-readable storage medium for storing a program whereby a new card game can be implemented.

It is a further object of the present invention to provide a storage device for storing data specific to a new card game.

It is a further object of the present invention to provide an image display device for displaying images specific to a new card game.

One embodiment of the present invention provides a game device for use in executing a card game between a player and an opponent on a screen by placing cards with predetermined capabilities. The game device executes the card game by displaying a state wherein the cards of the player and the opponent are arranged face downwards on the same screen, by confirming only the cards of the player by turning them face upwards in the state without being recognized by the opponent, and by setting mutually different competition environments.

The cards are given, as environment capability index data, capability indices representing a capability which changes according to said competition environments and are divided into a plurality of groups having mutual strength differential relationships.

The game device comprises means for storing said environment capability index data of the cards together with the groups of the cards, judgement means for judging the strength differential relationship between the groups and judging win or loss between cards on the basis of said environment capability indices, when the win or the loss can not be judged from the strength differential relationship between groups, executing means for executing said card game on the basis of the judgements made by said judgement means, display means for displaying said card game, and input means for inputting instructions required for said card game.

In this case, the strength differential relationships between the plurality of groups are determined in a continuous and cyclical manner such that each group displays superiority over one of the other groups, and displays inferiority to another one of the groups.

In this way, in the present invention, it is possible to increase the variation involved in win or loss judgement in the card game, by dividing cards into groups having strength differential relationships, rather than simply altering the capability index data for each card according to the respective competition, and hence the interest created by the card game can be further enhanced.

Moreover, a further embodiment of the present invention provides a computer-readable storage medium storing a program for executing a card game wherein players compete by playing cards having respectively designated capabilities, comprising: a step for setting mutually different competition environments, setting capability indices for each of said cards representing a capability which changes according to said competition environments, as environment capability index data, and storing said environment capability index data, dividing said cards into a plurality of groups having mutual strength differential relationships and storing said groups, judging the strength differential relationship between groups, and judging win or loss between cards on the basis of said environment capability indices, in cases where judgement of the strength differential relationship between groups does not apply; and a step for implementing said card game on the basis of the judgements made by said judgement means. In this case, the storage medium comprises storing means for storing information representing groups of said cards. By dividing the cards into groups having strength differential relationships in this way, it is possible to add further interest to the card game, compared to cases where win or loss is determined according to capability indices only.

Here, the storage means comprises a region for storing cards used normally and a special card region for storing special cards, and said program is composed in such a manner that it can only access the special card region in response to a specific combination of said cards.

By adopting this composition, it is possible to acquire cards which cannot be obtained during a normal game, by inputting an identification code from an external source. Moreover, by making it possible to exchange cards with another game device by means of communication, it becomes possible to maintain compatibility with other game devices, and rather than exchanging cards on a one-for-one basis, it is possible to exchange cards in various different ways, such as a several-to-one basis, or a one-to-several basis, or the like.

A further embodiment of the present invention provides a game device whereby game characters forming an opponent can be selected by the player, comprising a particular character storage region for storing particular characters which can be selected, when a predetermined code is supplied from an external source, and means for executing said game by accessing said particular character storage region when said predetermined code is input. Thereby, it is possible to enjoy a contest with a particular character which cannot be competed against in a normal game. Moreover, if the game is a card game, then the cards obtained during the contest with the particular character are different from the cards obtained during a contest with another character, and therefore the player's interest in his or her collection of cards is further enhanced.

BRIEF DESCRIPTION OF THE DRAWINGS

FIG. 4 is a list for describing necessary data relating to cards used in the card game relating to the present invention;

DESCRIPTION OF THE PREFERRED EMBODIMENTS

Figure 1A:
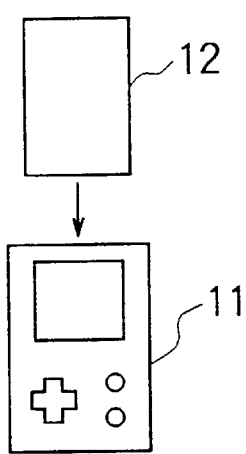
FIG. 1A is a diagram showing a case where a game is played by one player alone, using a portable game device relating to the present invention.

A commercially available portable game device 11 and a mode for using this portable game device are now described with reference to FIG. 1A and 1B. FIG. 1A shows a case where a player plays the card game according to the present invention (in other words, the new card game) alone, by inserting a cassette 12 storing a card game relating to the present invention into the portable game device 11. In this case, the player plays the new card game against an opponent formed by the portable game device 11 (hereinafter, called the 'computer') controlled by the program stored on the aforementioned cassette.

Figure 1B:
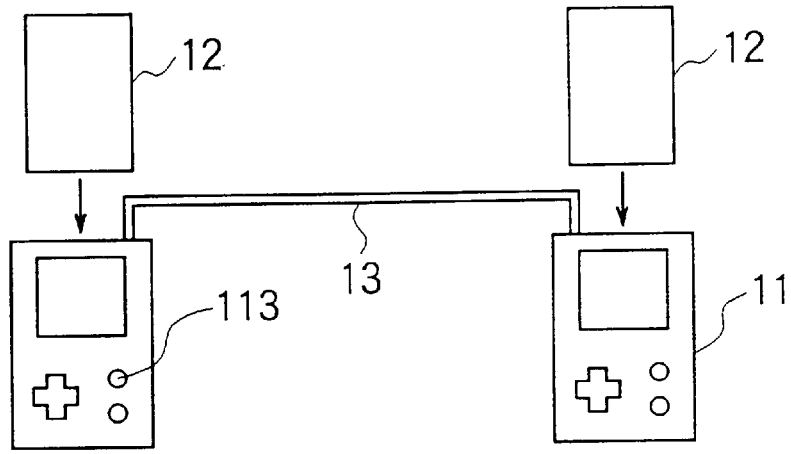
FIG. 1B is a diagram showing a case where two portable game devices relating to the present invention are connected together by means of the communications cable, and a game is played between the connected players.

On the other hand, FIG. 1B shows a case where two players, each respectively having a commercial portable game device 11, play the card game in a mode where the portable game devices 11 of the two players are mutually connected by means of a communications cable 13. Moreover, in the example illustrated, the portable game devices 11 are connected by means of a communications cable 13, but it goes without saying that the game may be played in a similar manner if the portable game devices 11 are connected by infra-red communications, or the like.

As is commonly known, the respective portable game devices 11 shown in FIGS. 1A and 1B are provided with a display screen formed from liquid crystal, operating buttons, and selection buttons, and when playing a card game, a cassette 12 containing a built-in storage medium according to the present invention for storing a program for the aforementioned card game is inserted into each of the portable game devices 11.

As shown in FIG. 1B, when playing a card game between two people, cassettes storing the new card game relating to the present invention may be inserted into both of the portable game devices 11, or a cassette storing the new card game relating to the present invention may be inserted into only one of the portable game devices 11, whilst a cassette storing the old card game proposed previously is inserted into the other game device. In this way, in the present invention, it is possible to play a game in a similar fashion even when cassettes storing card games which are mutually different in that one is an old card game and the other is a new card game are inserted into the game devices of the two players, thereby providing compatibility between players and also providing special functions, which are described hereinafter.

Here, the schematic structure of the storage medium 15 contained in the cassette is described with reference to FIG. 2. The storage medium 15 illustrated comprises a ROM (Read Only Memory) constituted by a semiconductor memory, and this semiconductor memory 15 is provided with a command area 151 for storing a series of commands constituting the card game program and a data area 152 for storing various data required for the card game. Moreover, the storage medium 15 relating to the present invention is provided with a partial data storage area 153 for storing special data (described below) used in the card game according to the present invention. The partial data area 153 forming part of the data area 152 will be described in conjunction with the description of the card game.

Next, the composition of the portable game device 11 for playing a game by inserting the cassette 12 illustrated in FIGS. 1A and 1B is described with reference to FIG. 3. The portable game device 11 illustrated here comprises a liquid crystal panel 21 forming a display screen, an operating panel 22 containing an array of operating button and selection buttons, and the like, and a CPU main unit 23, as disclosed, for example, in Japanese Patent Laid-open No. H02-210562. A cassette 12 containing the storage medium 15 illustrated in FIG. 2 is installed in the CPU main unit 23 by means of a connector 24.

The CPU main unit 23 comprises a CPU core 26, a port 27 provided between the CPU core 26 and the operating panel 22, a RAM 28 connected to the CPU core 26, and a ROM 30 connected to the CPU core 26. Moreover, the CPU core 26 is also connected to a buffer 31 for timing, addresses and data, and to the connector 24 via a bus. A display driving circuit 35 is provided between the CPU core 26 and the liquid crystal panel 21. A display RAM 42 storing characters to be displayed on the liquid crystal panel 21 is connected to the display driving circuit 35 via a display RAM interface 40.

Furthermore, in the portable game device illustrated, a communications control section 50 containing a communications control interface is connected to the CPU core 26 via a connector 51, in such a manner that the game device can be connected to an opponent's game device by means of the connector 51. The ROM 30 also stores an OS for controlling the liquid-crystal panel 21, the display driving circuit 35, the communications control section 50, and the like.

A cassette 12 storing the new card game relating to the present invention is connected to the CPU core 26 of the illustrated portable game device 11 by means of the connector 24. When a power on or reset operation is carried out in this state, then the CPU core 26 starts up the OS stored in the ROM 30, thereby initializing the whole portable game device, and at least a portion of the new card game program stored on the storage medium 15 contained in the cassette 12, and data corresponding to same, is transferred into the RAM 28 and display RAM 42, which function as main storage devices. In this state, the CPU core 26 executes the aforementioned new card game in accordance with operations made by the player via the operating panel 22, and the required displays data is displayed on the liquid-crystal panel 21.

In actual fact, the display RAM 42 is accessed via the display RAM interface 40 according to instructions from the player, and characters corresponding to display data are read out from the display RAM 42 and displayed on the liquid crystal panel 21 by means of the display driving circuit 35.

Firstly, the new card game relating to the present invention differs from the old card game in that 700 types of card and 99 cards of each type, namely, a total of 69,300 cards, are prepared, whereas in the old card game, 350 types of card and 99 cards of each type were prepared, making a total of 34,650 cards. Moreover, of the 700 types of card used in the new card game, 100 cards are not supplied to the players during the game, but rather have to be obtained by means of a separate operation.

Furthermore, it is also possible to exchange cards between the new card game relating to the present invention and the old card game, by means of communication. For example, cards in the 350 cards used in the old card game which are also included in the 700 cards of the new card game may also be used as cards for the new card game. In this case, since cards in the old card game are not Categorized into groups, in the new card game, they are assigned to a group according to a list, described hereinafter. On the other hand, 350 of the cards used in the new card game may also be used in the old card game. In the old card game, no group name is used.

Figure 2:
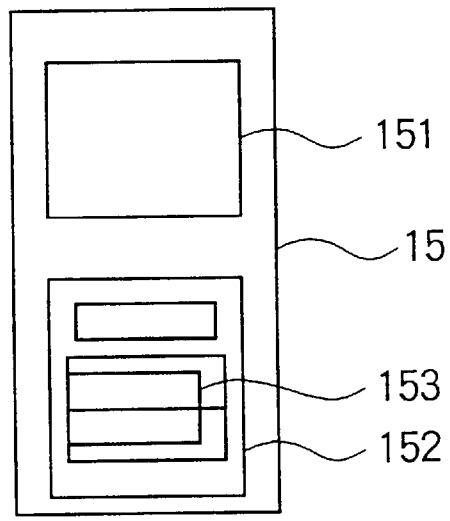
FIG. 2 is a conceptual diagram for describing the composition of a storage medium relating to the present invention.

The data relating to these cards is stored in the data storage area 152 of the storage medium 15 illustrated in FIG. 2, and when a card game is played, at least a portion of this data is transferred to, and stored in, the RAM 28 in the CPU main unit 23, and if a predetermined code is input, it is stored in the RAM 28 of the game device.

Here, the concept of the new card game relating to the present invention will be described. In the new card game, similarly to the old card game, the respective players play the game by placing cards, alternately, at prescribed positions on the liquid crystal panel 21 of the portable game device (in other words, a place on the screen), and seeking to reduce the life points (LP) of their opponent thereby. In this case, one of the characteristic features of the new card game relating to the present invention is that the cards are categorized into a plurality of groups, and strength differentials are set between these groups, these strength differentials being specified in a continuous and cyclical fashion, such that cards in a certain group display superiority over one other group, whilst displaying inferiority to cards in one other group. Moreover, it is also possible to categorize the plurality of cards into a plurality of families, whereby a plurality of groups belong to each family, and to apply the aforementioned strength differentials between card groups within each family, whilst also creating strength differentials between these families.

A further characteristic feature of the new card game relating to the present invention is that, at each turn, each player is able to lay out on the screen a prescribed number of cards (for instance, 5 cards,) located in a specified zone of the screen, and to specify attack or defense for each of the laid cards (hereinafter, called 'played cards'). This means that a player can specify opposing cards for 'played cards' already laid on the playing screen.

Yet a further characteristic feature of the new card game relating to the present invention is the fact that special cards which are not available during the card game can be obtained by inputting a predetermined code. This means that by inputting a password assigned to a card source other than a cassette storing card game software, it is possible for these special cards be used in a card game played on a game device.

A further characteristic feature of the new card game relating to the present invention is that it provides compatibility with the old card game in such a manner that cards in the old card game can be exchanged with cards in the new card game, by means of communication.

Next, the new card game relating to the present invention has the following points in common with the old card game. Namely, amongst the cards, field cards are prepared which represent fighting and playing areas set in the game, in other words, competition environments, and attack points and defense points are allocated for each competition field. For example, the competition fields are fields such as a forest, wilderness, mountain, grassland, sea, darkness, fighting field, or the like, and field cards representing each of these fields are prepared. A standard field (normal field) is also set and competition and fight take place in this standard field, as long as none of the field cards are laid As described above, in the new card game relating to the present invention, players are able to play a card game where they take account of the groups and families to which cards belong, as well as considering the attack and defense indices in the respective fields of the cards they hold.

Among the cards used in the new card game relating to the present invention, special cards called trap cards are also prepared, and by selecting one of these trap cards, it is possible to perform a prescribed action on the opponent. The remaining cards are divided into cards representing monsters having prescribed attributes and capabilities (here, called 'creature cards'), and back-up cards which display predetermined functions in particular circumstances, similarly to the cards in the old card game.

Referring to FIG. 4, a portion of a creature card list is shown in simplified form, and in reality, the creature card list illustrated is stored in the partial data storage region 153 of the storage medium 15 shown in FIG. 2, in the form of a file mxxx assigned to each card. When the card game is actually played, this information is transferred to the RAM 28 illustrated in FIG. 3. A name representing the monster depicted on the card and the attributes, etc. of same is assigned to each of these cards. Here, the names of the cards are shown as A00–B00, and so on. As described previously, in reality, 700 types of card are prepared, including the creature cards.

In the list shown in FIG. 4, group names (simply shown as group A and group B in the diagram) and family names are also allocated, in addition to the card names, A00, and so on. It can be seen that the cards illustrated (A00–B03) all belong to the family FA.

Furthermore, each card is also allocated points scores, in other words, capability indices, representing the capability (strength) of that card. These capability indices vary between fields (between competition environments), taking the attributes of the creature into consideration. In other words, since the capability indices vary depending on the competition environment, they may also be called competition environment capability indices. Moreover, the cards illustrated in FIG. 4 also have different capability indices depending on whether the card is used for attack or for defense.

As described above, in the new card game relating to the present invention, cards do not simply have differing capability indices for attack and defense in each of the competition environments, or fields, but rather, they are divided into groups and families, and the relative strengths of cards also vary depending the groups to which they belong, rather than simply being based on differences in life points. Therefore, it is possible to increase the interest generated by the card game.

The cards listed in FIG. 4 are used when attacking or defending in any of the fields, including the standard field (or normal field), and the players are able to compete with each other by specifying attack and defense in each of the fields. For example, card A00 shown in the top row in FIG. 4 belongs to group A and family FA, and it has a 3000-point attack capability index and a 2500-point defense capability index in the normal field. When used in a field other than the normal field, this card A00 has a different attack capability index and defense capability index to those in the normal field.

As the diagram reveals, there are cards with various different capability index settings, for instance, cards which have a high defense capability index when used for defense in a particular field, but only have a low attack capability index when used for attack in the same field, and conversely, cards which only have a low defense capability index when used for defense, but have a high attack capability index when used for attack, and the like.

Moreover, in the present invention, the cards are categorized into groups and families, and as described later, strength differentials are assigned between groups. In this way, the new card game relating to the present invention makes it possible to enjoy a card game which has richer variety than an old card game.

Figure 5:
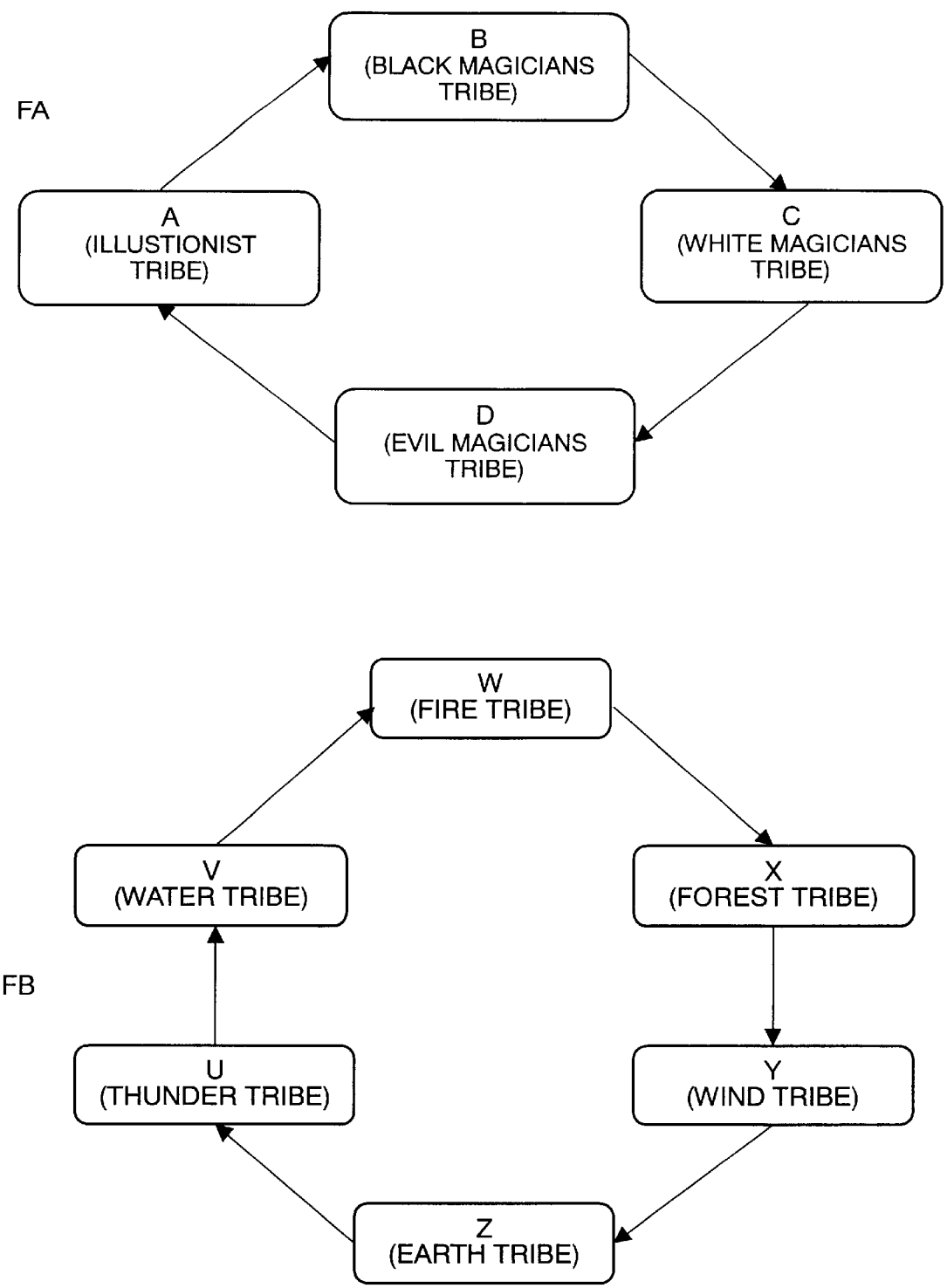
FIG. 5 is a diagram for describing categorization of cards used in the card game relating to the present invention and strength differentials between same.

The group and families shown in FIG. 4 are now described in concrete terms with reference to FIG. 5.

As shown in FIG. 5, the creature cards described above are divided into two families FA and FB. Of these, FA is divided into four groups, A, B, C, D, a different name being assigned to each group, for example, illusionists, black magicians, white magicians and evil magicians. The strength differentials between the groups are indicated by the arrows in the diagram. In the case of this example, the side with the arrow head denotes superiority and the side with the arrow tail denotes inferiority. Consequently, for example, group A has superiority over group D, but is inferior to group B. Similarly, group C has superiority over group B, but is inferior to group D. In this way, the strength differentials between the groups A, B, C, D within family FA form a chain-like series. Here, a strength differential is a relationship which determines that a card in the superior group will win and a card in the inferior group will lose, regardless of their respective capability indices, in a case where a card from a superior group and a card from an inferior group are laid on the playing area together.

On the other hand, the cards belonging to family FB are divided into 6 groups, namely, U, V, W, X, Y, Z, which are respectively assigned the names of thunder tribe, wind tribe, fire tribe, forest tribe, wind tribe, and earth tribe. A chain-like series of strength differentials exists between the various groups U, V, W, X, Y, Z, similarly to the case of family FA. In other words, a continuous chain of strength differentials is set between groups in the same family.

As described above, the cards in each group have superiority over cards in a particular other group and they win unconditionally over cards in this particular group, whilst they are also inferior to cards in one further group and they lose unconditionally to cards in this further group.

Moreover, if the opposing players lay cards belonging to different families, or if they lay cards belonging to the same family, and also belonging to the same group, or alternatively, if they lay cards which are not related by a strength differential, for example, cards from groups A and C in family FA in FIG. 5, then the victory is judged according to the field card and the respective attack and defense capability indices of the cards.

Next, the new card game relating to the present invention is further described with reference to FIG. 6. As stated previously with regard to FIG. 1, a player may play a card game against the program loaded into the portable game device (in other words, against the computer,) or he or she may play against a further player connected by means of a communications cable.

Firstly, prior to the game, a cassette 12 is loaded into the portable game device and the game is started by switching on the power supply. In this case, at least a portion of the program in the storage medium 15 contained in the cassette 12 is loaded into a predetermined region of the RAM 28 of the portable game device.

The cards held by each player are stored in a storage area called a 'bag'. This storage area is provided in a prescribed region of the RAM 28. In this embodiment, of the 69,300 game cards, 300 cards, for example, are placed in the player's bag at the time that the player starts the game, and the number of cards in the bag increases or decreases according to the results of the player's subsequent game against the computer or against another player by means of communication. Furthermore, a player may also exchange cards with another player by means of communication. The combination of 300 cards in the bag at the start of the game may be varied between different cassettes.

Figure 6:
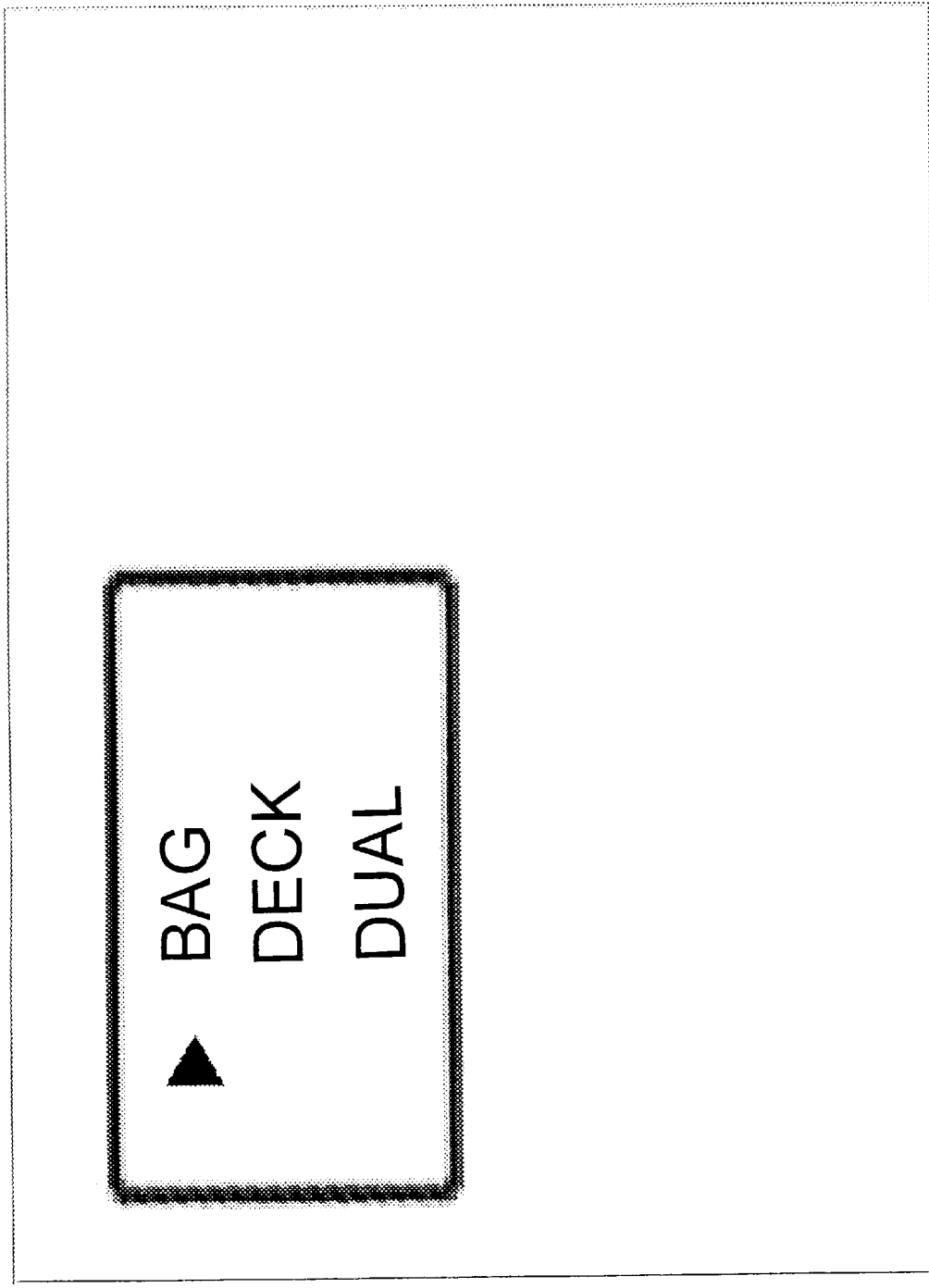
FIG. 6 is a diagram for describing a card game relating to the present invention by means of a display screen, wherein a screen displaying a preparatory stage of the card game is illustrated.

At the start of a game, when the player holding the portable game device has selected whether to play against the computer or against another player, the screen shown in FIG. 6 appears. Hereinafter, the computer or other player forming the opponent shall simply be called the 'opponent', and the player playing the game by operating the portable game device illustrated shall be called the 'player'.

Three options, 'bag', 'deck' and 'duel' are displayed on the display screen shown in FIG. 6, and in the situation illustrated here, a triangular selection cursor is positioned over 'bag'. When the 'bag' display on the screen in FIG. 6 is selected, the cards in the aforementioned bag are displayed successively. If, on the other hand, the 'deck' display is selected by the selection cursor, then as described below, 40 cards are taken from the bag, as instructed by the player, to form a deck. Furthermore, if 'duel' is selected, then the game actually starts.

Figure 7:
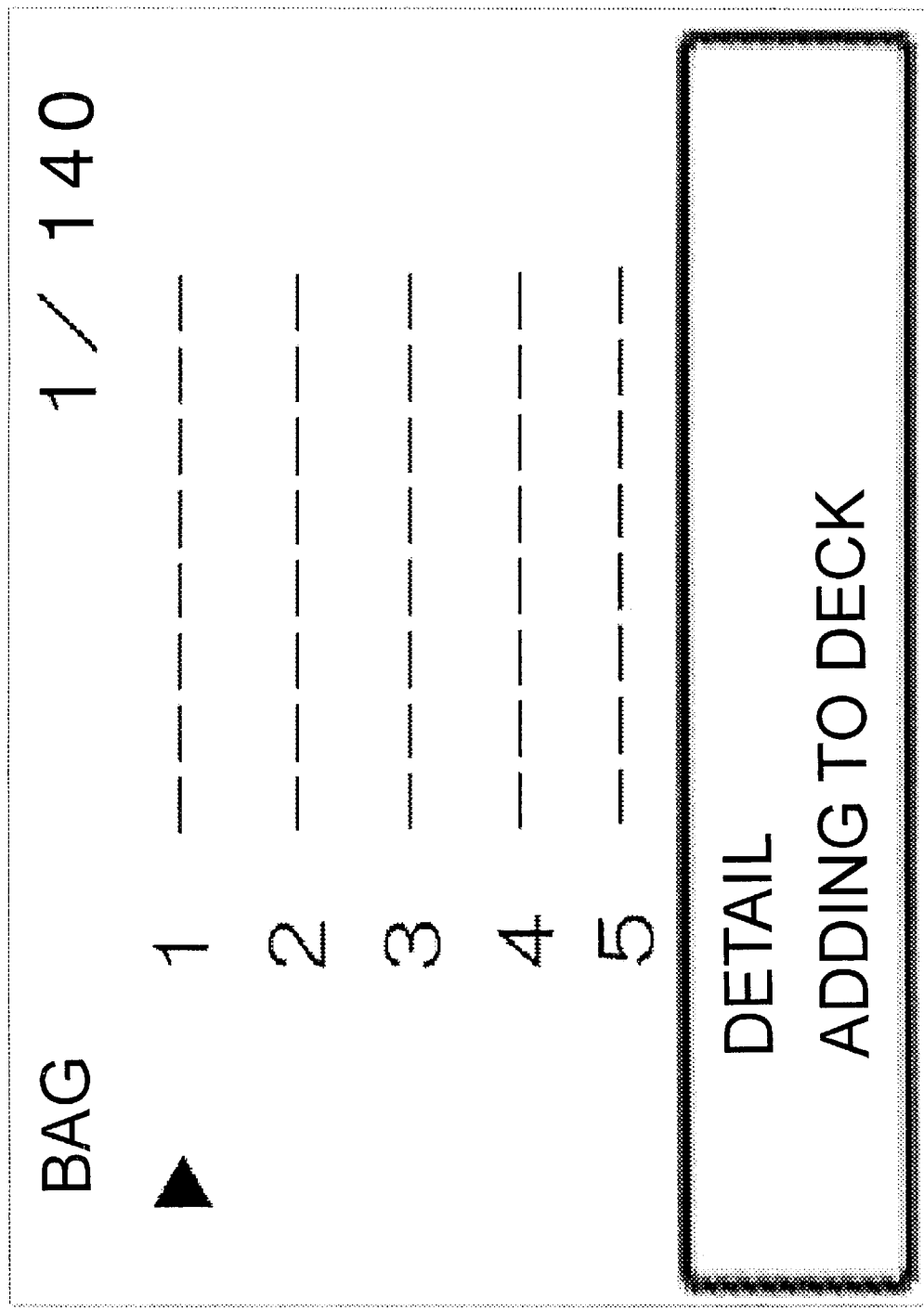
FIG. 7 is a diagram showing a display screen displayed when a particular selection is made at the stage illustrated in FIG. 6.

When 'bag' is selected in the state illustrated in FIG. 6, the contents of the bag are displayed, as shown in FIG. 7. As the display (1/140) at the top right of the diagram shows, there are bag display screens from number 1 to number 140, and in FIG. 7 screen number 1 of these screens is depicted. In the example illustrated in FIG. 7, cards corresponding to the number list 1 to 5 on the screen are riot displayed. This indicates that the player has not specified cards corresponding to numbers 1 to 5. Moreover, the five cards from A00 to A04 in the creature card list shown in FIG. 4, for instance, are listed against numbers 1 to 5, and if these cards are held in the bag, then the group name, family name, card name and number of cards are displayed in addition to the card number.

Next, the player may move to the second bag screen by switching the screen display, using the cursor scroll, for example, whereby the numbers, group names, family names, card names and number of cards for the five cards corresponding to numbers 6–10 will be displayed. Thereafter, if this operation is repeated until the 140th screen is displayed, then the group name, family name, card name and number of cards corresponding to all numbers up to 700 will have been displayed, and by this means the player is able to ascertain for himself or herself the cards that are held in the bag.

Furthermore, if the 'detail' item shown at the bottom of FIG. 7 is selected, then the attributes, capabilities, and the like, of the corresponding card will be displayed in detail. If the 'addition to deck' item is selected, then the card is returned from the bag to the deck.

On the other hand, if the 'deck' item shown in FIG. 6 is selected, then the player selects 40 cards from the cards held in the bag, as he or she wishes, in order to form a pile of cards to hold, in other words, a deck. As stated previously, the 40-card deck may be formed according to the wishes of the player, or it may be formed automatically by the computer program. In the latter case, a deck of 40 cards is created automatically, even if the player has not seen or ascertained all of the cards held in his or her own bag, and the card game starts. This means that the game may be started directly, without the player necessarily being aware of the contents of the bag or the contents of the deck.

Figure 8:
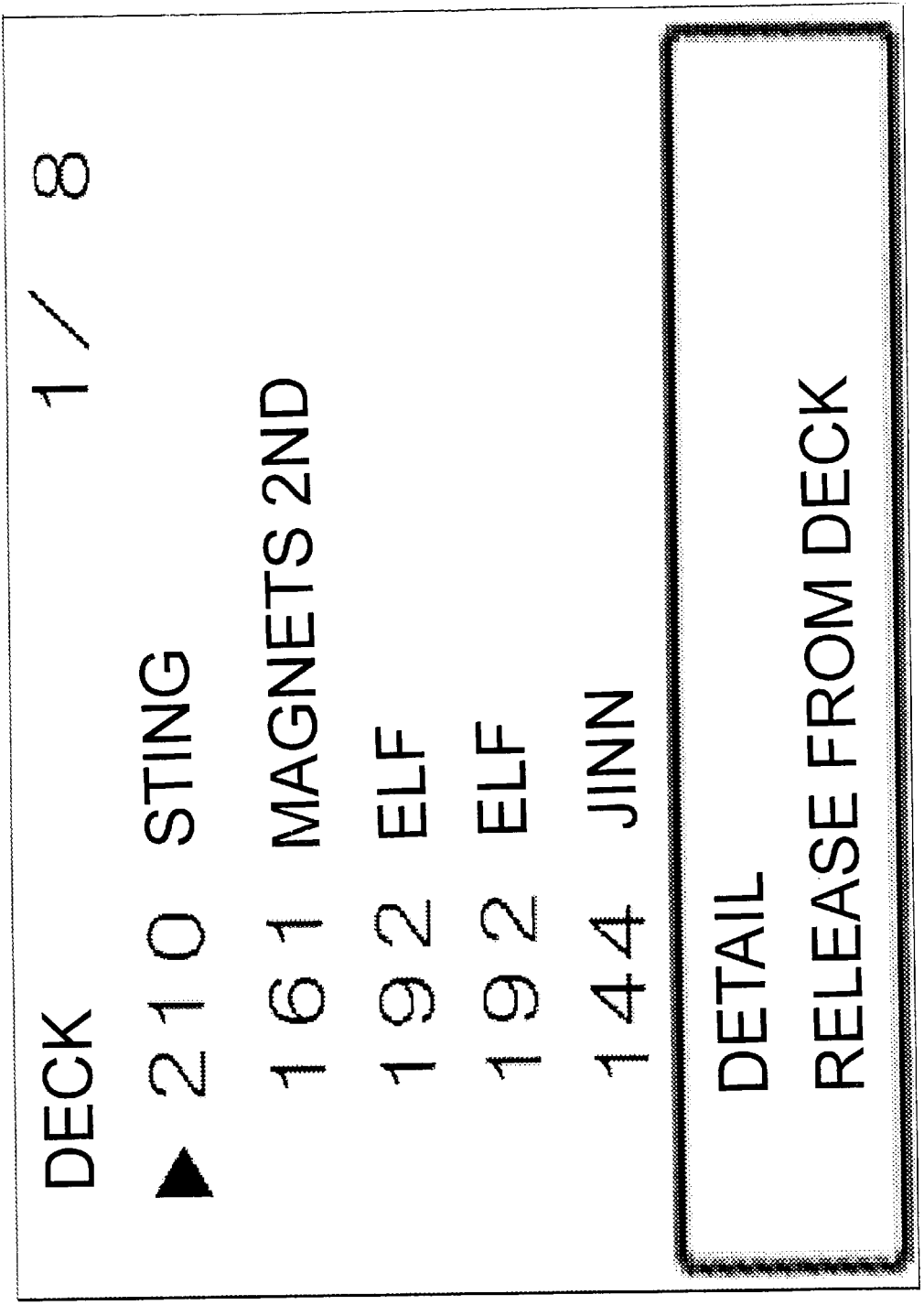
FIG. 8 is a diagram showing one example of a screen displayed after FIG. 7.

FIG. 8 illustrates a display screen showing the cards in hand forming the deck. The display screen showing the cards in the deck is divided into eight screens, from a first deck display screen to an eighth deck display screen, as indicated by the display (1/8) at the top right of FIG. 8. Here, the first deck display screen is Illustrated. As the diagram shows, the number allocated to the card and the name of the card are displayed on the deck display screen. In the case of this; example, it can be seen that cards numbered 210, 161, 192, 192 and 144 have been drawn out of the bag to form part of the deck and these cards respectively have the names, 'sting', 'magnets 2nd', 'elf', and 'jinn'. As FIG. 8 also reveals, it is possible to select more than one card of the same type for inclusion in the deck (in this example, 'elf').

If the 'detail' item shown in the bottom portion of the deck display screen is selected, then the group name, family name, capability index, and the like, of the corresponding card can be confirmed. If the 'release from deck' item is selected, then the corresponding card is returned from the deck to the bag.

Thereafter, by switching the deck display screen successively, it is possible to display up to the eighth deck display screen. In this way, the player is able to confirm the 40 cards in his or her hand, which form the deck. The foregoing description related only to one of the players, but 40 cards in hand forming a deck are also prepared for the opponent, by means of a similar procedure.

When decks comprising 40 cards in hand have been prepared respectively for each of the opposing players, the game enters a competition state. In this state, the computer selects five cards at random from the deck of each player, and arranges them, face down, in specified zones on the display screen.

In this case, five cards from each player are placed in a row, face down, in specified zones of the liquid crystal panel. For example, the specified zone in which the five cards from the first player are arranged may be provided in the A bottom portion of the screen, whilst the specified zone for the opponent's cards is provided in the upper portion of the screen. The sets of five cards arranged in the specified zones on the screen are known as a hand. The specified zones on the screen, and the like, are described later.

In the new card game relating to the present invention, at each turn, the player is able to lay out a plurality of cards (up to a maximum of 5 cards) from his or her hand located in the specified zone to the playing area on the screen, and by designating 'attack' or 'defense' to each of the cards laid out, the player ends his or her turn.

Figure 9:
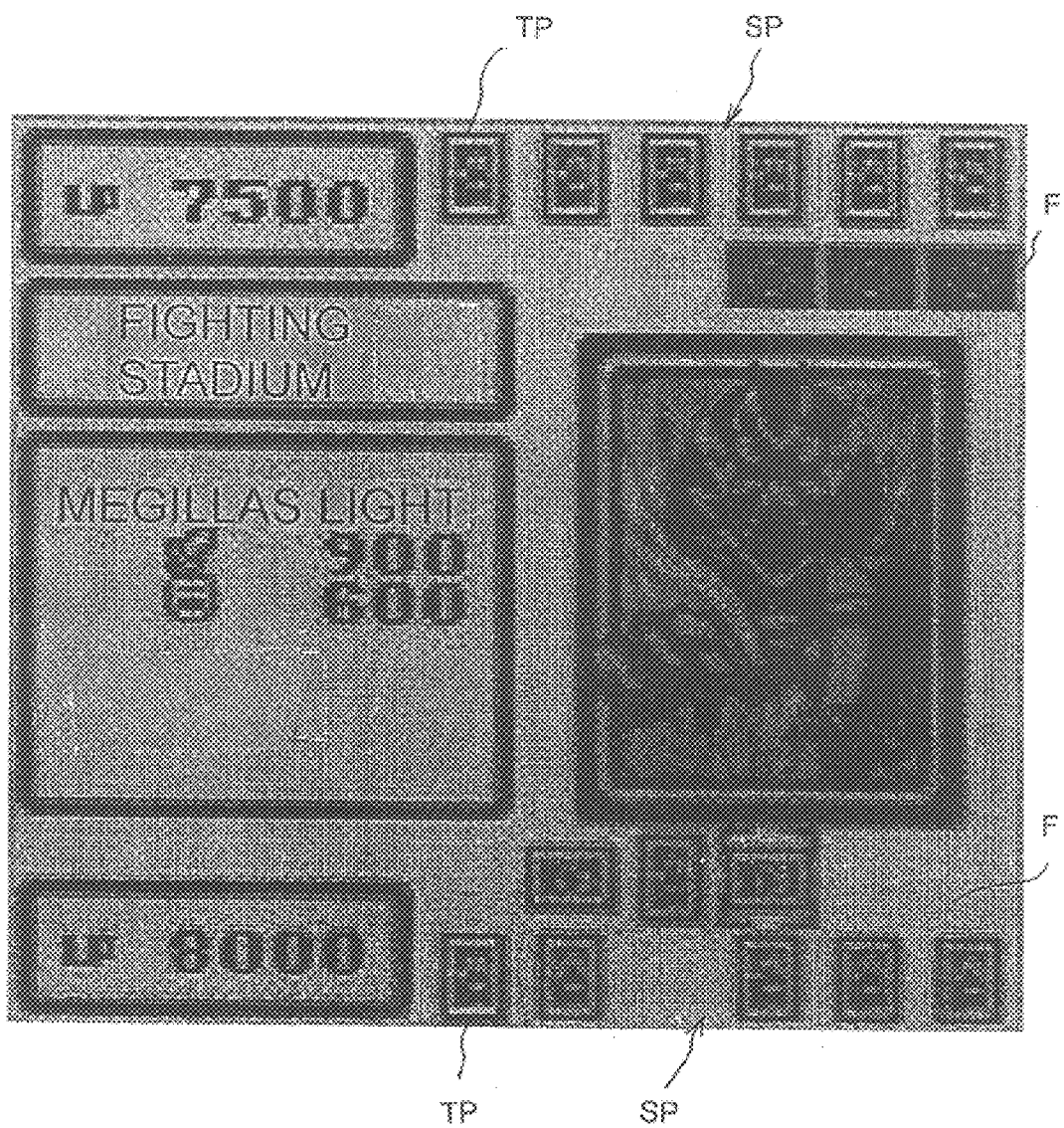
FIG. 9 is a diagram showing a case where one creature card used in the card game relating to the present invention is displayed on the screen of the portable game device.

This point is now described more specifically with reference to the game screen illustrated in FIG. 9. In the example shown, the lower side of the diagram is the display region for the player and the upper side thereof is the display region for the opponent. Moreover, the central region is used to display the picture of the selected cards and the field, as well as the groups, attack capability index and defense capability index or the selected cards. In this example, the card selected by the cursor is a card representing a creature (in other words, a monster) having the name of 'megillas light', and it can be seen that this card has a 900 attack capability index and a 600 defense capability index in the selected field of 'Fighting Stadium', and furthermore, that the 'megillas light' belongs to the group of 'Black magicians'.

In FIG. 9, the display region for the player on the screen comprises a life point (LP) area, specified zone (SP) where the player's hand is aligned, trap card zone (TP) where trap cards are placed, and an area provided above the specified zone (SP). Similarly, the display region for the opponent also comprises a life point (LP) area for displaying the opponent's life points (LP), a specified zone (SP), trap card zone (TP), and an area for the opponent provided below the specified zone (SP). Moreover, in the example depicted, the trap card zones (TP) for the player and the opponent are both positioned to the left-hand side of the specified zone (SP) where the five-card hand is laid.

In the illustrated example, trap cards are placed respectively in the player's and opponent's trap card zones (TP), a five-card hand is positioned in the opponent's specified zone (SP), and three cards are positioned in the playing area, in other words, they are 'played'.

A four-card hand is positioned in the player's specified zone (SP) and a three cards are positioned in the playing area, the card at the right-hand edge of the playing area being indicated by a cursor. The card indicated by the cursor is displayed in the center of the screen, face upwards, along with its attributes.

In the screen illustrated here, it is the turn of the player at the bottom side of the screen, and in this turn, the player has played the creature card named 'megillas light', which is depicted in the center of the screen and is selected by the cursor, onto the playing area. It can also be seen that this 'megillas light' card belongs to the 'Black magicians' group and in the selected field of 'Fighting Stadium', it has a 900-point attack capability index and a 600-point defense capability index.

In the state shown on the screen, the player's hand consists of only four cards, rather than five cards. This indicates that the player's turn is continuing. In this way, in the new card game relating to the present invention, each player is able to play more than one card to the playing area and trap card zone (TP) during his or her turn. Moreover, in the example illustrated, the life points (LP) of the player is 8000, and the life points (LP) of the opponent is 7500.

The details of the trap card positioned in the trap card zone (TP) can be identified by each player him or herself, but he or she is not able to identify the details of the opponent's trap card until it is turned over.

In FIG. 9, there are three cards positioned in the playing area by the player towards the front of the screen, and these are displayed more brightly than the cards played onto the playing area by the opponent. The diagram displays a state where the player decides which of the cards he or she has played onto the playing area will be used to oppose which of the opponent's cards, in other words, to attack or defend against which of the opponent's cards.

Stated more specifically, in the screen depicted, the left-hand card of the three cards positioned on the player's playing area is placed sideways and hence is selected as a defending card, whilst the card positioned in the center of the player's playing area (F) is placed vertically, thereby selecting it as an attacking card. Moreover, the card on the right-hand side, which is selected by the cursor, is placed sideways and therefore selected as a defense card.

In the state illustrated, it is still not decided which of the opponent's cards will be used to oppose the central card that has been selected to attack. In order to depict this, in the example shown, the three cards positioned on the opponent's playing area are displayed dimly. On the other hand, on the screen depicting a state where the player is selecting attack and defense for his or her own cards, as illustrated in FIG. 9, the cards for which attack or defense has been decided are displayed brightly, whilst the cards for which attack or defense has not yet been decided are displayed dimly, similarly to the opponent's cards in FIG. 9.

The player's turn does not end until he or she has selected attack or defense for each of the cards played to the playing area, and therefore the player continues his or her own turn, while there remain cards which are displayed dimly.

The cursor itself can be moved around the screen by the player as he or she pleases, by means of the operating buttons, and hence in the state illustrated, the player is simply confirming the right-hand card by means of the cursor. As described previously, in this state, the player is able to select an opposing card to lay against a card which has been specified as an attack card and laid in the center.

In the embodiment illustrated, the player can place more than one card on the playing area during a single turn and can optionally indicate "attack" or "defense" at every cards placed on the playing field. On selecting "attack" or "defense", the player can move the cursor on the screen to specify which one of the opponent's cards is to be attacked or defended.

Figure 10:
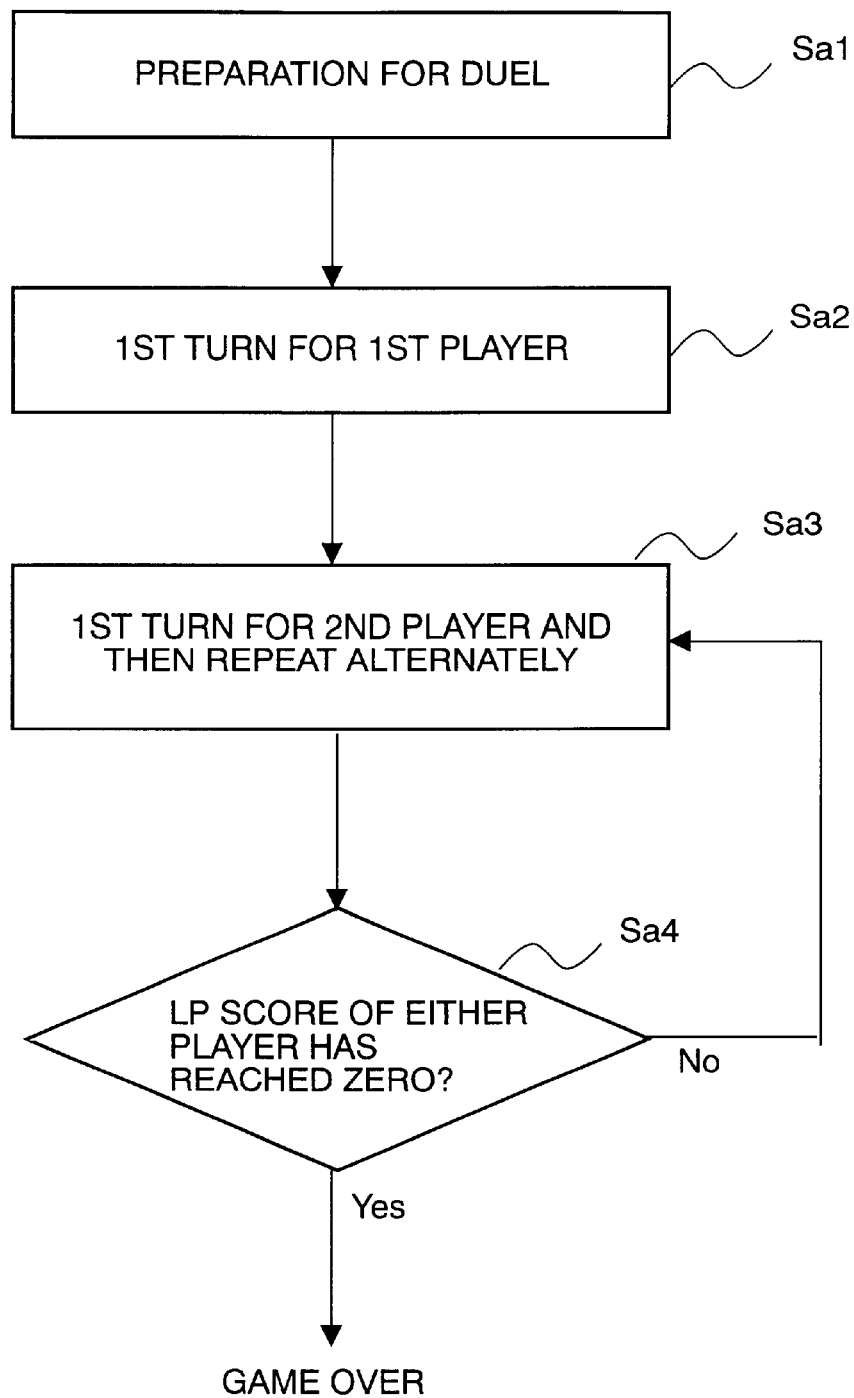
FIG. 10 is a flowchart for giving a conceptual description of the card game relating to the present invention.

The overall operation of the new card game relating to the present invention is now described schematically with reference to FIG. 10. Firstly, at step Sa1, processing is carried out until the 'duel' item shown on FIG. 6 is selected by the player, as described previously with reference to FIG. 7 and FIG. 8. Thereupon, at step Sa2, the first player performs the first turn. Here, the player is able to place a plurality of cards on the playing area and/or the trap card zone (TP). The operations performed during each turn are described later.

Next, at step Sa3, the second player performs his or her first turn, in a similar manner to the first player. At step Sa4, it is determined whether or not the life points (LP) of either the first or second players has reached zero. Unless either of the player's life points (LP) score has reached zero, step Sa4 returns to step Sa3. At step Sa3, the first player and the second player take further turns, alternately, whereupon the life points (LP) are judged at step Sa4. If the life points (LP) score of either of the players has reached zero at step Sa4, then the game is over.

Figure 11:
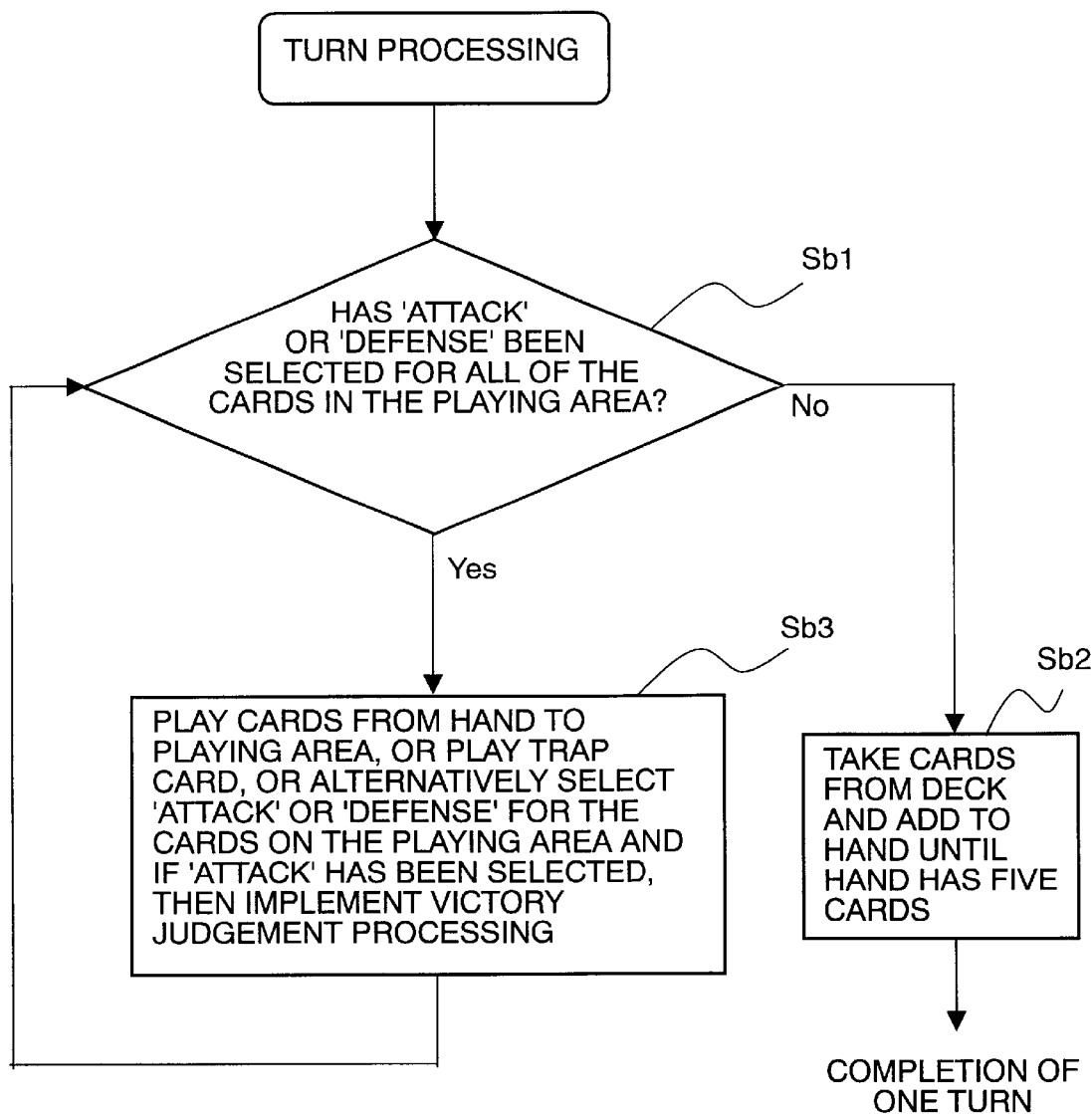
FIG. 11 is a flowchart for giving a detailed description of turn processing, in the processing illustrated in FIG. 10.

The processing operations performed at each turn illustrated in FIG. 10 are now described 'Nith reference to FIG. 11. Firstly, at step Sb1, it is determined whether or not 'attack' or 'defense' has been selected for all of the cards arranged on the playing area in the present turn. If it is judged at step Sb1 that 'attack' or 'defense' has been selected for all of the cards on the playing area, then step Sb2 is executed. At step Sb2, cards are taken out from the deck and used to replace the cards which have been laid to the playing area or the trap card zone (TP), so that the player's hand returns to 5 cards.

If on the other hand, it is determined at step Sb1 that 'attack' or 'defense' has not been selected for all of the cards on the playing area, then step Sb3 is executed. At step Sb3, the hand is laid from the hand specified zone (SP) onto the playing area and/or the trap card zone (TP). Instead of laying the hand to the playing area and/or the trap card zone (TP), it is also possible to select 'attack' or 'defense' for the cards which have been laid to the playing area. If 'attack' is selected for the cards, then victory judgement processing (described later) is implemented.

When step Sc3 is completed, the process returns to step Sb1, and the operation described above is repeated. To describe this operation more specifically, for example, if a player has laid one card (here called 'first card X'), and then lays a further card (here called 'second card Y'), directly, without specifying 'attack' or 'defense' for the first card X, then at this point, he or she may return to the first card X and specify 'attack' or 'defense' for that card. In this example, when 'attack' has been specified for first card X, victory judgement processing is implemented. The player is able to refer to the result of this victory judgement processing when considering the 'attack' or 'defense' function for the second card Y. In a state like this during a turn when 'attack' has been specified for one card, but 'attack' or 'defense' has not been specified for other cards, the other cards which have not been specified are displayed dimly, similarly to the cards on the opponent's playing area (F) shown in FIG. 9.

In the embodiment described above, when a player has still not finished his or her turn, he c)r she can play other cards, and when the player has finished specifying 'attack' or 'defense' for all of the cards played, then his or her turn ends. Namely, if there still remain cards which are dimly lit (in other words, if there still remain cards for which 'attack' or 'defense' has not been specified), then the player's turn is not completed, and therefore he or she can lay further cards to the playing area in FIG. 9. Since the player's turn only ends when 'attack' or 'defense' has been specified for all of the cards laid, it is possible for the player to refine his or her strategy before specifying 'attack' or 'defense' for all of the cards.

If there is a card for which 'attack' has been selected amongst the player's cards which have been laid on the playing area, then victory judgement processing is implemented.

Figure 12:
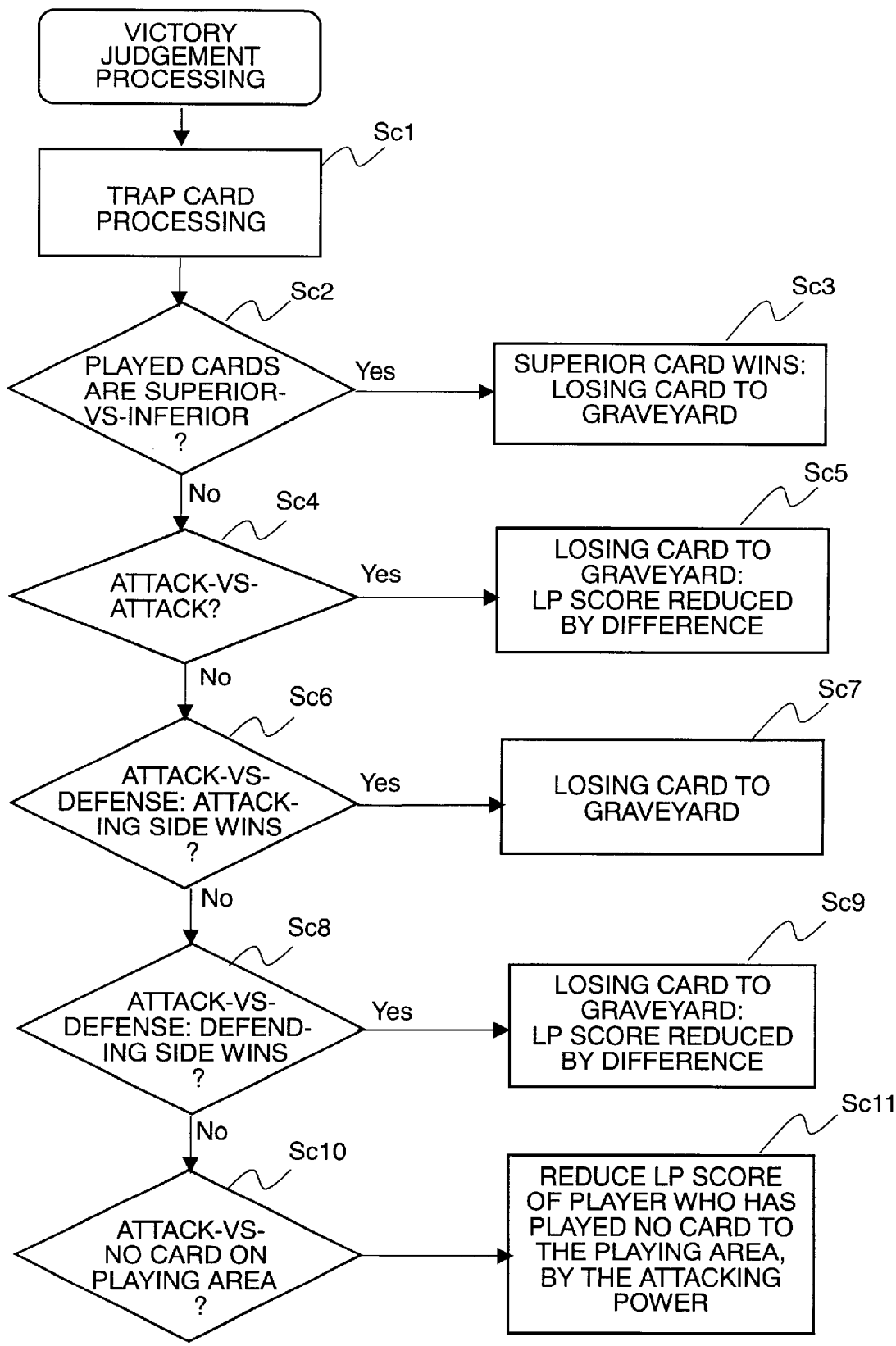
FIG. 12 is a flowchart for giving a more specific description of victory processing in FIG. 11.

The victory judgement processing in the new card game relating to the present invention is now described more specifically with reference to FIG. 12. The victory judgement processing illustrated in FIG. 12 is executed when 'attack' has been selected for one of the cards laid on the playing area, as described previously. In this victory judgement processing, firstly, at step Sc1, processing relating to trap cards laid on the trap card zone (TP) is carried out. This trap card processing also includes processing for determining whether or not there are any trap cards laid on the trap card zone (TP), and if a trap card is not laid on, then it proceeds to the next step Sc2. If a trap card is laid on the trap card zone (TP), and if the conditions in which this trap card is effective are satisfied in the cards on the opponent's side, then the action specified for the trap card is carried out on the opponent's cards.

Next, at step Sc2, it is determined whether or not the cards which have been played to the playing area are part of a group relationship which determines a group strength differential. When determining this group strength differential, as stated previously, at least one of the cards has been selected for 'attack', but even if only one card has been selected for 'attack' and the other cards have been selected as 'defense', then victory judgement based on the group strength differentials is carried out. If it is determined that cards which are subject to group strength differential judgement processing have been played to the playing area, step Sc2 proceeds to step Sc3.

At step Sc3, it is determined which card is superior and which is inferior, regardless of the attack capability index and defense capability index of the cards. In this case, a card belonging to a superior group wins over a card belonging to an inferior group, and the losing card is discarded to the 'graveyard' and disappears from the screen. Here, when a card is discarded to the 'graveyard', this means that this card is disabled until the current game ends. In other words, the cards which have been discarded to the 'graveyard' are retained in the 'bag' and can be used in a subsequent game.

At step Sc3, it is possible to implement processing whereby, if the capability index of the losing card is higher than the capability index of the winning card, then the life points (LP) score of the defeated player remains unchanged, whereas if the capability index of the losing card is lower than the capability index of the wining card, then the life points (LP) score of the defeated player is reduced by an amount corresponding to the difference in points score between the capability indices of the cards.

On the other hand, if at step Sc2 the cards laid by the players to the playing area are not subject to superiority/inferiority judgement processing, then step Sc2 transfers to step Sc4. At step Sc4, it is determined whether or not the cards laid are in an attack-against-attack situation. If it is determined that an attack-against-attack situation does exist, then step Sc4 transfers to step Sc5, where the respective attack capability indices on the first player's card and the second player's card are compared, and the card having the higher attack capability index is judged to be the winner, whilst the card with the lower capability index is judged to be the loser. Moreover, at step Sc5, the losing card is discarded to the 'graveyard' and vanishes from the screen, and the life points (LP) score of the player holding the defeated card is reduced by the difference between the attack capability indices of the cards used in the contest, whereupon the sequence proceeds to step Sb1 illustrated in FIG. 11.

Next, if at step Sc4 it is determined that the first and second player's cards are not in an attack-against-attack situation, then step Sc6 is executed. At step Sc6, it is judged whether or not an attack-against-defense situation has been selected between the first and second players, and if an attack-against-defense situation has been selected, then it is determined whether or not the attack capability index is greater than the defense capability index.

If this judgement processing shows that the attack capability index is greater than the defense capability index, then it is judged that the attacking side has won and the processing in step Sc7 is carried out. At step Sc7, the losing card, in other words, the defending card is discarded to the 'graveyard'. If the player who has selected to defend loses in this way, then the life points (LP) score of the losing defending side is not reduced, but remains the same. However, the number of cards held by the defending player in the current game is reduced.

If, on the other hand, attack-against-defense is selected and the attacking side does not win at step Sc6, then the sequence transfers to step Sc8, and it is judged that the defending side has won. When the defending card has won, step Sc9 is executed. At step Sc9, points corresponding to the difference between the defense capability index and the attack capability index are taken from the life points (LP) score of the defeated player and the defeated card used on the attacking side is discarded to the 'graveyard'.

At steps Sc6 and Sc8, if it is judged that an attack-against-defense situation has not been selected, then after step Sc8, step Sc10 is executed. At step Sc10, it is determined that either one of the first player or second player has not laid a creature card on the playing area, despite the fact that the other player has specified an attack. In this case, the life points (LP) score of the player who has not laid a creature card is reduced by the attack capability index of the attacking card.

Thereupon, the sequence returns to step Sb1 in FIG. 11, where it is detected whether or not 'attack' or 'defense' selection has been made for all of the cards on the playing area, and if this selection has been made for all of the cards, then the contest ends and the sequence moves to step Sa4 in FIG. 10, where it is judged whether either player's life points (LP) score has reached zero. If the life points (LP) score of either one of the players has reached zero, then processing is implemented whereby, for example, one card is passed, randomly, from the losing player to the winning player. When a card is passed over in this way, it is; possible for the card which is to be handed over to the opponent, if the player loses at step Sa1 in FIG. 10, to be shown in advance to the opponent, as an incentive. Moreover, in this case, the card handed over to the opponent when a player loses in this way is erased from the 'bag' of the losing player, and cannot be used in a subsequent game.

Next, the trap game processing illustrated in FIG. 12 will be described. As stated previously, a trap card is a card which, when placed in the trap card zone (TP), becomes active and causes a certain action on the cards on the opponent's side, in cases where the opponent has laid a card on the playing area which matches the activation conditions for that trap card. More specifically, various different trap cards are prepared, such as trap cards which cause the opponent's attack to rebound directly and damage the life points (LP) score of the attacking player, trap cards which come into effect when a card used for attack has a low attack capability index, trap cards which cause a contest between two cards on the opponent's side, trap cards which come into effect when the attack capability index on the opponent's side is greater than a prescribed value, and the like. These trap cards are also stored in the form of a list as illustrated in FIG. 4, and the function and action of each trap card is encoded and stored in the list.

Figure 3:
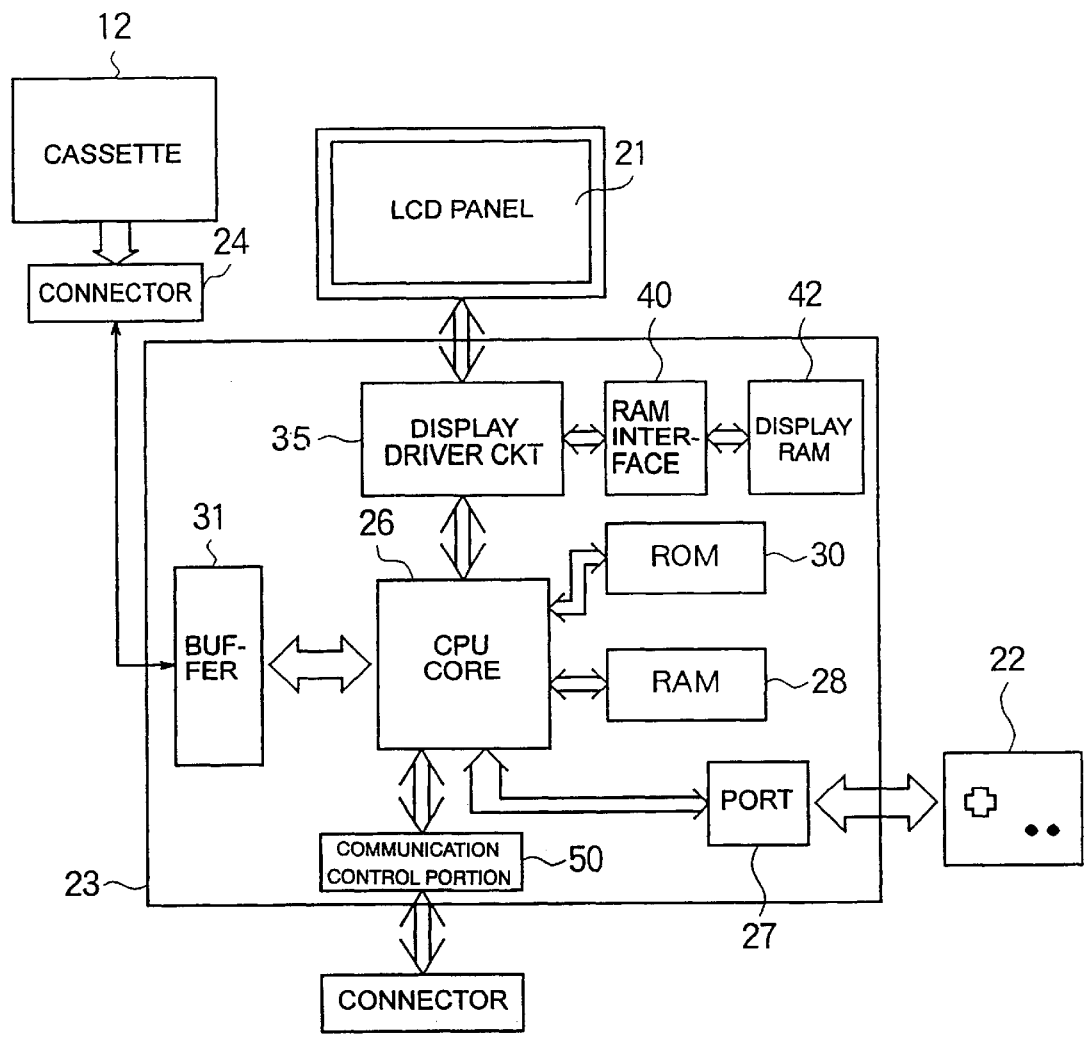
FIG. 3 is a block diagram for describing a portable game device used in the present invention.

In the trap card processing illustrated in FIG. 12, the CPU core 28 shown in FIG. 3 identifies the function of each trap card and executes processing corresponding to this function.

On the other hand, in the new card game relating to the present invention, the function and action of trap cards is not simply universally effective, and there are also prepared magic cards which inflict damage back on a player when he or she has played a trap card, magic cards which enable a player to restore life points (LP) when they are laid on the playing area (restoring cards), and the like. Moreover, magic cards which reduce the capability index of the opponent's cards are also prepared. These magic cards are able to exert their prescribed effects when they are arranged and selected as part of the player's hand in the specified zone (SP).

Next, if a cassette 12 storing the new card game relating to the present invention is used in the state illustrated in FIG. 1B, then it is possible to exchange cards by means of communication. For example, if a predetermined number of specific cards are transmitted by a transmitting game device 11 to a receiving game device 11, then the receiving game device 11 will always be able to convert these into unobtainable cards.

Moreover, a card game can still be implemented in cases where a cassette storing an old card game is installed in one of the game devices in FIG. 1B, for instance, the left-hand game device, and a cassette containing the new card game relating to the present invention is installed into the other game device, for instance, the right-hand game device. In this case, the devices may be constituted in such a manner that if the device having the cassette containing the old card game transfers a certain number of cards to the device having the cassette containing the new card game, then these cards can be converted to special cards, if the combination of cards transmitted is a prescribed combination. Thereby, it is possible to maintain compatibility between the old card game and new card game which have different numbers of cards.

More specifically, in cases where cards are transferred from the new card game to the old card game, the 350 types of card in the old card game which are included in the 700 types of card in the new card game can be exchanged with cards in the new card game. In this case, since the cards in the old card game are not divided into groups, when exchanging cards with the new game, group names are appended according to the list shown in FIG. 4. Moreover, if a plurality of cards in the old card game for a specific combinations, for example, K, L, M, then these can be converted into a single prescribed card in the new card game, for example, card mx. In this case, the card mx in the new card game may be a card which cannot normally be obtained during the game.

In this way, by trading cards between card games of different versions, it is possible to obtain cards which cannot by acquired during a normal game. Furthermore, it is also possible, conversely, to transmit and exchange cards from the new card game to the old card game. In this case, the group names and family names used in the new card game are ignored in the old card game.

The example described above related to a case where cards are transmitted from an old card game to a new card game, but it is also possible to exchange cards between card games of the same version, for instance, between old card games or between new card games. In this case, the combination of cards transmitted (for example, K, L, M) may be received as the same combination (K, L, M), or if the combination of cards is a particular combination, it may be converted by the receiving side into cards which are cannot be obtained during the game.

As the foregoing reveals, the partial data storage area 153 of the storage medium 15 shown in FIG. 2 comprises an area for storing normal creature cards and a special card area for storing special cards, and only when prescribed conditions are satisfied does the device enter a state where this special data region can be accessed and the cards in this region can be used.

Moreover, as shown in FIG. 3, since the game device which can implement the new card game relating to the present invention comprises a connector 51 for making an external connection, it is possible to obtain cards which cannot normally obtained, by inputting a prescribed external cord using the aforementioned connector. More specifically, by appending an identification code based on a bar code, or the like, to a card source sold separately from the cassette, and inputting this identification code as a password, it is possible also to obtain cards corresponding to this card source. In this case, the number of the file within the storage medium 15 can be stored by relating it to the password. More specifically, the password can be stored temporarily in the FAM 28 of the game device in FIG. 3, whereupon the prescribed region 153 (FIG. 2) of the cassette 12 is accessed and hence the card corresponding to this password can be stored.

Rather than appending identification codes to a card source, it is also possible to adopt a composition wherein an identification code is assigned to a written medium, such as a magazine, or the like, and this identification code is input from the magazine, or the like, to the game device as a password.

Below, an embodiment relating to the present invention using a password is now described in more concrete terms.

Firstly, as shown in FIG. 1A, if a player is competing alone against the portable game device 11, then in reality, the opponent is determined by selecting from a plurality of characters previously prepared in the portable game device 11. In other words, the portable game device 11 relating to the present invention is constituted in such a manner that a plurality of characters which form an opponent to the player are prepared in the portable game device 11 and the player is able to select one of the characters. In this case, the respective characters are set such that they have decks containing mutually different cards, and their strengths in the card game also differ. Therefore, the player is able to select an opponent character which corresponds to the player's own skill level, and when the card game is completed, the cards supplied to the player may also vary depending on the opponent character. Consequently, the higher the number of opponent characters, the more cards corresponding to individual characters the player will be able to collect by competing against different characters;, and hence the greater the player's interest in the card game.

Figure 13:
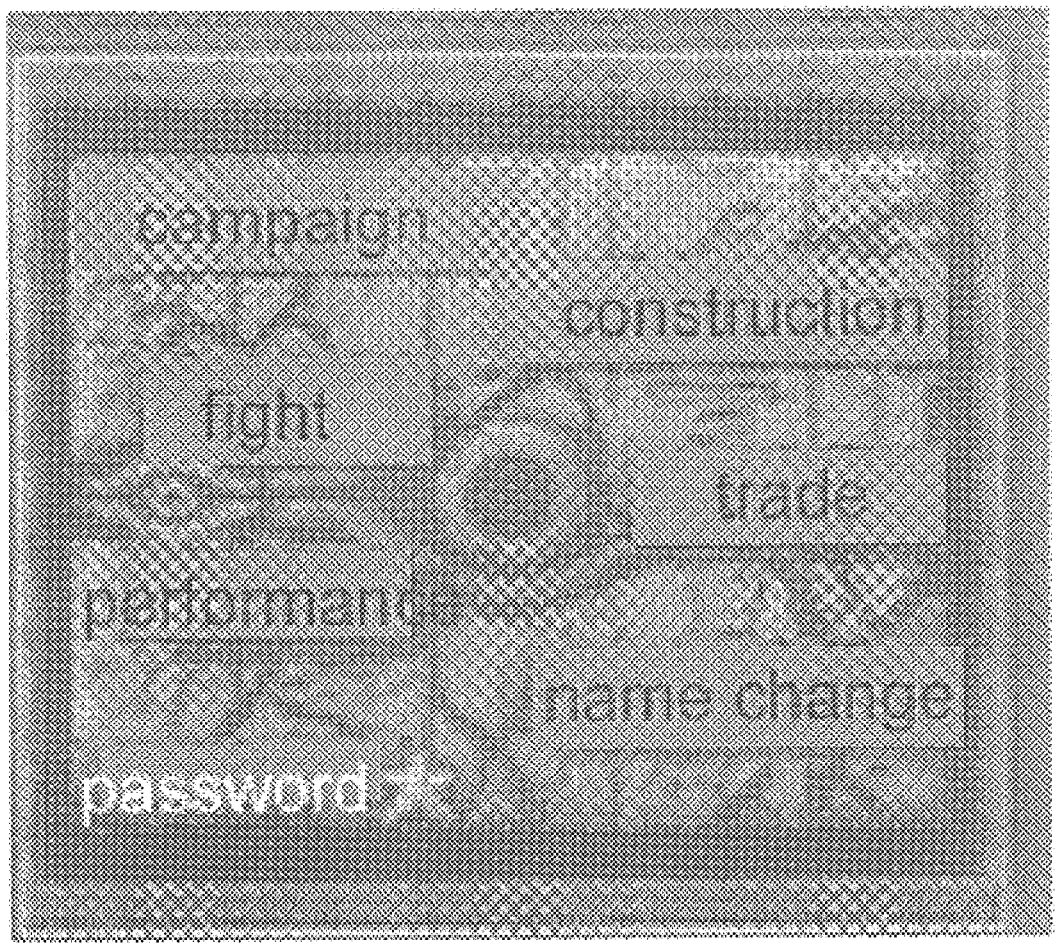
FIG. 13 is a diagram showing a display screen for describing operations performed in a game device relating to a further embodiment of the present invention.

Taking these points into consideration, the embodiment relating to the present invention is devised such that the number of characters forming opponents is increased by using passwords. FIG. 13 depicts a mode selection screen in a portable game device 11 relating to this embodiment of the present invention. In the mode selection screen illustrated, it can be seen that in addition to the selectable modes, such as campaign, fight, performance, construction, and the like, a password input mode for inputting a password is also displayed. This example illustrates a state where the password input mode is selected by means of a star-shaped cursor, and consequently, the password' text only is highlighted.

Figure 14:
FIG. 14 is a diagram showing a password input screen used in the embodiment illustrated in FIG. 13.

If the player presses the selection button whilst the password input mode is being selected by the cursor, as shown in the display screen illustrated in FIG. 13, then the display switches to a password input screen as illustrated in FIG. 14. In the password input screen, a number input region for inputting eight digits is displayed to the player along with a message instructing the player to input an 8-digit password.

An 8-digit password can be input one digit at a time in the number input region of the password input screen, as indicated by the cursor. In the presentexample, the password columns are selected by moving the cursor by means of the right and left buttons of the cross-shaped key provided on the operating panel of the portable game device 11, and the numbers in each column can be changed between 0 and 9 by operating the up and down buttons. If the input password is incorrect, then the fact that the password is wrong is conveyed to the player and a message prompting re-input of the password is displayed. The password input mode is terminated when an incorrect password is input a prescribed number of times.

In the present embodiment, the same screen is used for inputting a password corresponding to a card and inputting a password corresponding to a character. In other words, by inputting a password whilst the screen illustrated in FIG. 14 is being displayed, it is possible to enter a password corresponding to a card and it is also possible to enter a password corresponding to a character on the same screen. This means that in the case of this embodiment, of the $10^8$ possible passwords, a portion thereof are allocated to cards and the other passwords are allocated to characters.

In this embodiment, rather than simply being able to obtain cards which cannot normally be acquired by inputting passwords, it is also possible to change the characters which form the opponent in the card game, by means of the password. In other words, when the password input screen as shown in FIG. 14 is displayed, the player is able to make a display screen showing a particular character appear, by inputting a password specified for a particular character, as disclosed in a card source, magazine, or the like. The passwords used for particular characters may also be transmitted via a network, such as the Internet, or the like. Moreover, passwords for particular characters may also be acquired from game devices of a different format to the portable game device illustrated.

In either cease, the particular characters in question are characters which differ from the characters previously stored in the cassette 12 which forms the storage medium, and in the present invention, this means that the program stored in the cassette 12 can be modified partially by means of external input.

Below, the operations performed when a password corresponding to a character is input will be described with reference to FIG. 3. Firstly, it is assumed that a password corresponding to a particular character has been input on the display screen in FIG. 14, by controlling the operating panel 22 shown in FIG. 3. Here, it is also assumed that a prescribed password, a command for displaying a particular character which is displayed visually for the first time when the aforementioned prescribed password is input, a card selected by the particular character, the attributes of the particular character, and the like, are previously set in the program stored in the cassette 12.

Therefore, if the prescribed password is input, then a deck comprising 40 cards corresponding to the particular character relating to this password is prepared inside the portable game device 11. In this embodiment, the particular character storage area for storing an image of the particular character and a card image for the particular character is provided in the RAM 28.

Figure 15:
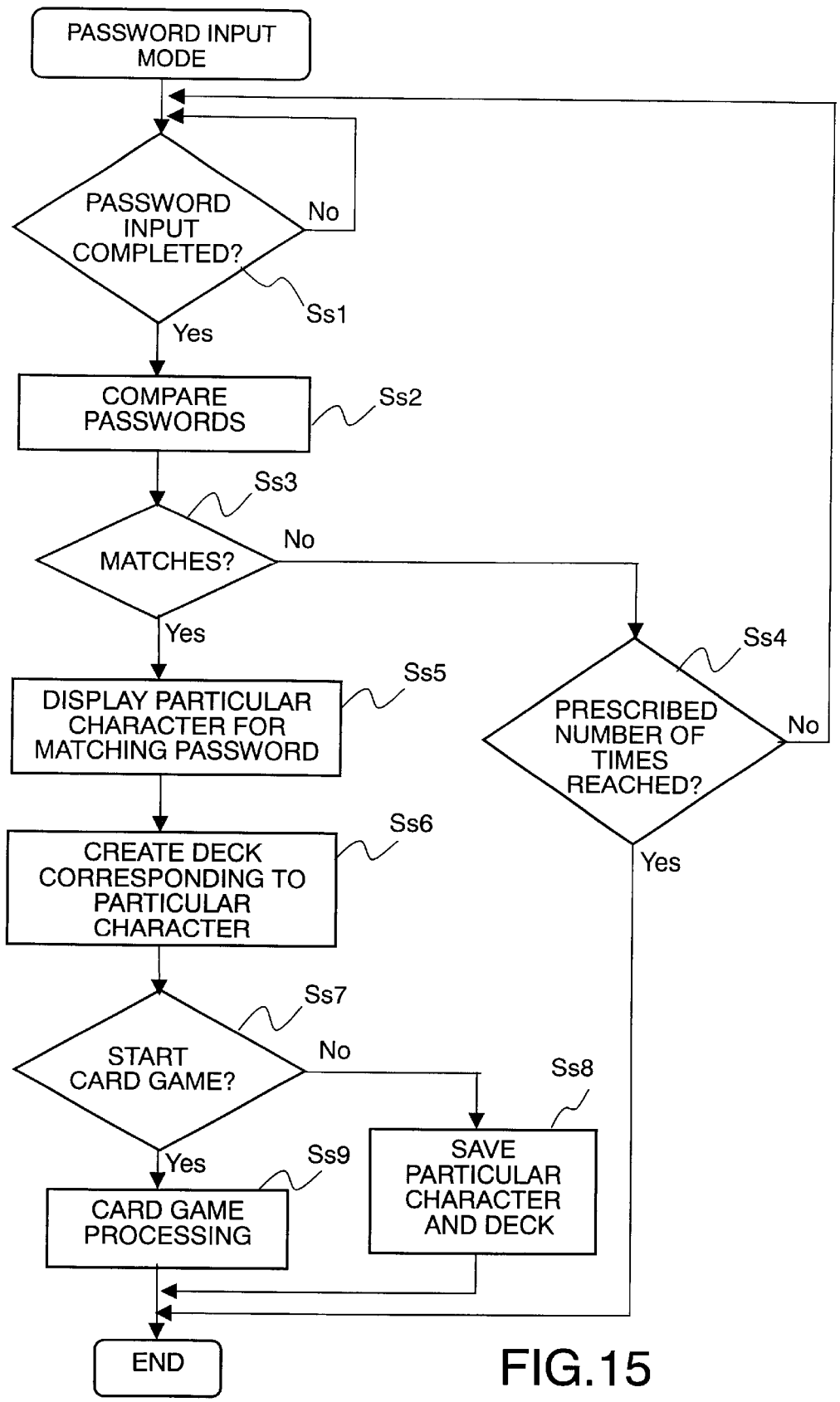
FIG. 15 is a flowchart for describing operations performed in a game device relating to the embodiment of the present invention shown in FIG. 13 and FIG. 14.

The operations performed when a password corresponding to a character is input will now be described with reference to FIG. 3 and FIG. 15. Firstly, the CPU core 26 in the CPU main unit 23 illustrated in FIG. 3 causes a character selection screen for specifying the opponent to be displayed on the liquid crystal panel 21. This character selection screen displays the character determined by the portable game device and also shows that there is a password input mode, thus indicating that a character other than the aforementioned character can be selected. In this state, if the player chooses the password input mode, then the display moves to a password input mode as shown in FIG. 15, and password input processing is implemented. In password input mode, at step Ss1, the CPU core 26 determines whether or not a password of the prescribed length (8 digits) has been input. The CPU core 26 performs this operation by detecting the number of digits in the password entered by the player by controlling the operating panel 22. When the length of the password reaches the prescribed number of digits, an input prompt screen is displayed.

When the player has finished entering a password of the prescribed number of digits, the CPU core 26 moves to password comparison processing in step Ss2. Here, a password previously set as a comparison reference is stored in the particular character storage area of the RAM 28, as described previously, and the CPU core 26 access this particular character storage area when comparing passwords.

Thereupon, at step Ss3, the CPU core 26 judges whether or not the input password matches the passwords previously set in the portable game device. If the input password does not match the specified password, then the processing of the CPU core 26 moves to step Ss4, and it is determined whether or not the player has input a password a prescribed number of times. If the number of password inputs made by the player has not reached the prescribed number, then the CPU core 26 returns to step Ss1 and awaits input of a further password. If, on the other hand, at step Ss4, the player has input a password the prescribed number of times, and the input password does not match the specified password, then the password input mode is terminated.

If it is detected at step Ss3 that the password entered by the player does match the specified password, then the CPU core 26 controls the display driving circuit 35 and the display RAM 42 in such a fashion that the character corresponding to the matched password (here, called the particular character) is displayed on the liquid crystal panel 21.

Thereupon the CPU core 26 controls the RAM 28 and forms a deck comprising 40 cards corresponding to the particular character (step Ss6). In this state, it is determined at step Ss7 whether or not the player has instructed the card game to be started. If the player has not instructed the start of a game, then data relating to the particular character and the deck corresponding to that particular character is stored in the RAM 28 under the control of the CPU core 26 (step Ss8), and password input mode is terminated. In this example, it is assumed that the particular character and the corresponding deck replace another character and deck, but if an external memory, such a memory card, or the like, can be connected to the portable game device, it is also possible to store deck relating t:o the particular character and deck in an external memory.

At step Ss7, if the player instructs the start of a game, then the aforementioned card game is executed (step Ss9), a card game is played using the aforementioned character and the corresponding deck, and the password input mode is also terminated by start of the card game.

As state previously, in this embodiment, information relating to a particular game in the portable game device is disclosed by means of media other than the portable game device, and by incorporating this information into the particular game in the portable game device, as and when required, the user is able to increase the variety of the particular game, thereby making it possible to maintain the user's interest in the particular game.

Moreover, according to a further embodiment of the present invention, a game device capable of executing a game using prescribed characters is used, and it is possible to prepare media bearing prescribed data corresponding to these prescribed characters and to implement games using these prescribed characters in the aforementioned game device by inputting the aforementioned prescribed data as obtained from the aforementioned media by means of the Internet, or the like. In this embodiment, prescribed data relating to the game characters, for instance, passwords, may be transmitted to a user who is able to execute the game, by means of the Internet, or the like, and the user is able to play a game using characters corresponding to the prescribed data.

The embodiment described above relates to a case where a game is played using a commercially available portable game device, but the present invention is not limited to this is any way, and it may also be applied, in a similar manner, in a case where a storage medium or storage device relating to the present invention is incorporated in a game machine used commercially in a game center, for example.

As stated previously, in the present invention, the cards are divided into a plurality of groups, and by assigning continuous and cyclical strength differential relationships between the groups, it is possible to develop the card game and further enhance the interest of the user. Moreover, cards can also be exchanged by means of communications, making it possible to collect a rich variety of cards. Moreover, in the present invention, it is also possible to acquire cards which cannot normally be obtained, by entering a code from another card source.

What is claimed is:

1. A game device for use in executing a card game between a player and an opponent on a screen by placing cards with predetermined capabilities, the game device executing the card game by displaying a state wherein the cards of the player and the opponent are arranged face downwards on the same screen, by confirming only the cards of the player by turning them face upwards in the state without being recognized by the opponent, and by setting mutually different competition environments;

the cards being given, as environment capability index data, capability indices representing a capability which changes according to said competition environments and being divided into a plurality of groups having mutual strength differential relationships;

the game device comprising:

means for storing said environment capability index data of the cards together with the groups of the cards;

judgement means for judging the strength differential relationship between the groups and judging win or loss between cards on the basis of said environment capability indices, when the win or the loss can not be judged from the strength differential relationship between groups;

executing means for executing said card game on the basis of the judgements made by said judgement means;

display means for displaying said card game;

input means for inputting instructions required for said card game; and communicating means for sending and receiving information related to said cards, so as to exchange said cards through said communicating means;

wherein predetermined conditions to the conduct of an activity are satisfied when the combination of a plurality of cards supplied via said communication means is coincident with a prescribed combination.

2. The game device according to claim 1, wherein said environment capability indices of each card are varied on an attach side and a defense side and said judgement means judges win or loss between cards on the basis of these varying capability indices.

3. The game device according to claim 1, wherein said executing means sets, on said attack side and said defense side, a competition environment selected from said mutually different competition environments and executes said card game under the competition environment thus set.

4. The game device according to claim 1, wherein the strength differential relationships between said plurality of groups are determined in such a manner that either one of the groups has superiority over one of the other groups and has inferiority to another one of the groups.

5. The game device according to claim 1, wherein said plurality of cards are divided into a plurality of families, each family respectively containing a plurality of groups, and no strength differential relationships exist between the plurality of groups belonging to each of said families.

6. The game device according to claim 1, further comprising a storage medium which is attached to said game device, wherein said storage medium comprises storing means for storing information relating to said cards, and said storing means comprises a region for storing cards used normally and a special card region for storing special cards, the special cards in said special card region only being readable when predetermined conditions are satisfied.

7. The game device according to claim 6, wherein said predetermined conditions are satified by supplying prescribed codes provided from a source outside the game device.

8. The game device according to claim 1, wherein a plurality of cards is placed on the screen at each turn.

9. A computer-readable storage medium readable by a computer which stores a program for executing a card game between a player and an opponent by placing cards with respectively designated capabilities onto a screen, said program comprising the steps of:
arranging the cards face downwards on the same screen, with the cards of the player alone which are turned face upwards, without being recognized by the opponent;
determining mutually different competition environments, along with capability indices which are assigned as environment capability index data to each of said cards and which represent capabilities variable according to said competition environments;
storing said environment capability index data with said cards divided into a plurality of groups which have mutual strength differential relationships;
judging the strength differential relationships between groups to decide win or loss of the cards; and
judging win or loss between cards on the basis of said environment capability indices, when win or loss can not be decided by the strength differential relationship between groups;
executing said card game on the basis of the judgements made by said judgement means;
wherein said environment capability indices of the cards are varied on using the cards as an attack side and a defense side; and at said judgement step, win or loss between cards is judged on the basis of these varying capability indices together with the strength differential relationships between groups;
wherein said storage medium comprises a region for storing cards which are used normally and a special card region for storing special cards, and
wherein said program is composed in such a manner that it is able to access said special card region in response to prescribed combinations of said cards.

10. The storage medium according to claim 9, wherein the strength differential relationships between said groups are determined in a continuous and cyclical fashion.

11. The storage medium according to claim 9, wherein said program divides said cards into a plurality of families, in such a manner that each family contains a plurality of the groups, arid said program does not judge strength differential relationships between said plurality of families.

12. The storage medium according to claim 9, wherein said program judges cards transmitted by communication and accesses said special card region if a combination of said cards is identical with the prescribed combination.

13. A game device for use in executing a card game between a player and an opponent on a screen by placing cards with predetermined capabilities, the game device executing the card game by displaying a state wherein the cards of the player and the opponent are arranged face downwards on the same screen, by confirming only the cards of the player by turning them face upwards in the state without being recognized by the opponent, and by setting mutually different competition environments;
the cards being given, as environment capability index data, capability indices representing a capability which changes according to said competition environments and being divided into a plurality of groups having mutual strength differential relationships;
the game device comprising:
means for storing said environment capability index data of the cards together with the groups of the cards;
judgement means for judging the strength differential relationship between the groups and judging win or loss between cards on the basis of said environment capability indices, when the win or the loss can not be judged from the strength differential relationship between groups;
executing means for executing said card game on the basis of the judgements made by said judgement means;
display means for displaying said card game;
input means for inputting instructions required for said card game; and
communicating means for sending and receiving information related to said cards, so as to exchange said cards through said communicating means;
the game device further comprising:
a storage means for storing special cards which are readable only when a combination of a plurality of cards received through the communicating means is coincident with a prescribed combination determined as predetermined conditions.

14. The game device according to claim 13, wherein said environment capability indices of each card are varied on an attach side and a defense side and said judgement means judges win or loss between cards on the basis of these varying capability indices.

15. The game device according to claim 13, wherein said executing means sets, on said attack side and said defense side, a competition environment selected from said mutually different competition environments and executes said card game under the competition environment thus set.

16. The game device according to claim 13, wherein the strength differential relationships between said plurality of groups are determined in such a manner that either one of the groups has superiority over one of the other groups and has inferiority to another one of the groups.

17. The game device according to claim 13, wherein said plurality of cards are divided into a plurality of families, each family respectively containing a plurality of groups, and no strength differential relationships exist between the plurality of groups belonging to each of said families.

18. The game device according to claim 13, wherein said storage means comprises a storage medium which is attached to said game device, wherein said storage medium comprises a region for storing cards used normally and a special card region for storing special cards, the special cards in said special card region only being readable when predetermined conditions are satisfied.

19. The game device according to claim 18, wherein said predetermined conditions are satisfied by supplying prescribed codes provided from a source outside the game device.

20. A game device for use in executing a card game between a player and an opponent on a screen by placing cards with predetermined capabilities, comprising:
   a display for displaying the card game;
   a storage unit operative to store the cards together with the predetermined capabilities assigned to the cards;
   a communication section operative to send and receive information related to said cards, so as to externally exchange the cards at least between a player and a source outside the game device;
   a detector operative to detect whether or not a combination of a plurality of cards received through the communication section is coincident with a prescribed combination determined as predetermined conditions; and
   a special card memory operative to store special cards which are readable only when coincidence is detected between a current combination of the plurality of the cards and a prescribed combination.

21. The game device according to claim 20, wherein said plurality of cards are divided into a plurality of families, each family respectively containing a plurality of groups, and no strength differential relationships exist between the plurality of groups belonging to each of said families.

22. The game device according to claim 20, wherein said storage unit comprises a storage medium which is attached to said game device, wherein said storage medium comprises a region for storing cards used normally and a special card region for storing special cards, the special cards in said special card region only being readable when predetermined conditions are satisfied.

23. The game device according to claim 22, wherein said predetermined conditions are satisfied by supplying prescribed codes provided from a source outside the game device.

24. A computer readable storage medium readable by a computer which stores a program for executing a card game between a player and an opponent by placing cards with respectively designated capabilities onto a screen, said program comprising the steps of:
   communicating information related to said cards so as to exchange cards;
   storing special cards in a special card region and normal cards in a normal card region; and
   accessing said special card region in response to prescribed combinations of said cards received in said communication step.

25. A computer readable storage medium according to claim 24, wherein said accessing is permitted when a combination of said cards is identical to a prescribed combination.

* * * * *